United States Patent
Martin

(10) Patent No.: US 6,704,743 B1
(45) Date of Patent: Mar. 9, 2004

(54) SELECTIVE INHERITANCE OF OBJECT PARAMETERS IN OBJECT-ORIENTED COMPUTER ENVIRONMENT

(75) Inventor: Timm Owen Martin, Union, KY (US)

(73) Assignee: Copernus, Inc., Cincinnati, OH (US)

( * ) Notice: Subject to any disclaimer, the term of this patent is extended or adjusted under 35 U.S.C. 154(b) by 364 days.

(21) Appl. No.: 09/660,904

(22) Filed: Sep. 13, 2000

Related U.S. Application Data

(60) Provisional application No. 60/153,651, filed on Sep. 13, 1999.

(51) Int. Cl.$^7$ ................................................. G06F 7/00

(52) U.S. Cl. .................... 707/103 R; 707/201; 707/206

(58) Field of Search ........................... 707/103 Y, 206, 707/3, 2, 201; 709/107, 224, 310; 715/501.1; 717/104, 164; 711/122

(56) References Cited

U.S. PATENT DOCUMENTS

| | | | | |
|---|---|---|---|---|
| 4,999,806 | A | | 3/1991 | Chernow et al. ............ 364/900 |
| 5,345,587 | A | | 9/1994 | Fehskens et al. ............ 709/102 |
| 5,794,256 | A | | 8/1998 | Bennett et al. .............. 707/206 |
| 5,832,224 | A | | 11/1998 | Fehskens et al. ............ 709/223 |
| 6,049,673 | A | * | 4/2000 | McComb et al. ............ 717/164 |
| 6,061,708 | A | | 5/2000 | McKeehan et al. .......... 709/101 |
| 6,105,041 | A | | 8/2000 | Bennett et al. .............. 707/206 |
| 6,351,751 | B1 | * | 2/2002 | Traversat et al. ........ 707/103 Y |
| 6,507,891 | B1 | * | 1/2003 | Challenger et al. .......... 711/122 |
| 6,560,617 | B1 | | 5/2003 | Winger et al. ............... 707/204 |

OTHER PUBLICATIONS

Winans, T.B.; Object technology in the extended enterprise; Enterprise Distributed Object Computing Workshop, 1998. EDOC '98. Proceedings. Second International, Nov. 3–5, 1998 ;Page(s): 378–389.*
Washabaugh et al., "Incremental Garbage Collection of Concurrent Object for Real–Time Applications", *IEEE*, 1990, pp. 21–30.
Willard et al., "Autonomous Garbage Collection: Resolving Memory Leaks in Long Running Network Applications", *IEEE*, 1998, pp. 886–896.
Gupta, et al., "Reliable Garbage Collection in Distributed Object Oriented Systems", *IEEE*, 1998, pp. 324–328.
*Microsoft Press Computer Dictionary*, "Garbage Collection," 1997, p. 214.
Smith, Randall B. et al., *Programming as an Experience: The Inspiration for Self*, Sun Microsystems Laboratories, Mountain View, CA, (no date), 28 pages.
Ungar, David et al., *SELF: The Power of Simplicity*, Abstract for LISP and Symbolic Computation: An International Journal, 4, 3 (1991), The Netherlands, 20 pages.

* cited by examiner

*Primary Examiner*—Diane D. Mizrahi
(74) *Attorney, Agent, or Firm*—Wood, Herron & Evans, L.L.P.

(57) ABSTRACT

An apparatus, program product, and method of managing entities in an object-oriented environment permit the selective inheritance of parameters or fields from parent entities and into child entities responsive to persistent indications of the inheritability of such parameters or fields stored in a non-volatile memory. Further, in many implementations, basing a determination of inheritability on such persistent information permits inheritance to be selectively restricted for a parameter or field without requiring any changes to the database schema for a database that controls access to the parent and child entities.

23 Claims, 18 Drawing Sheets

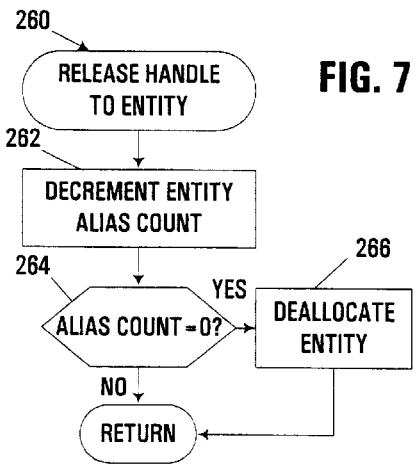
FIG. 7
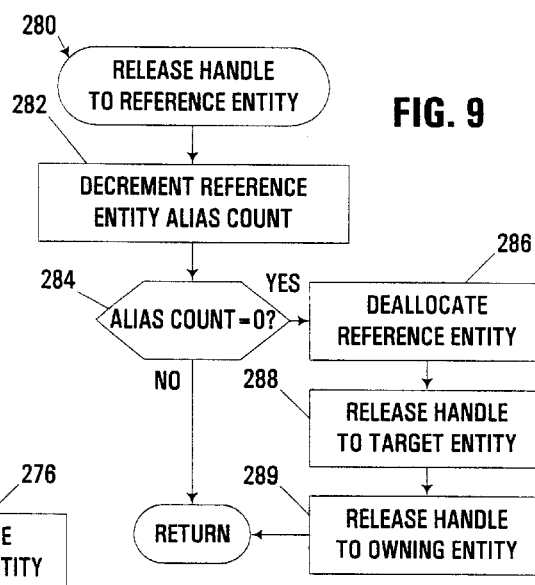
FIG. 9
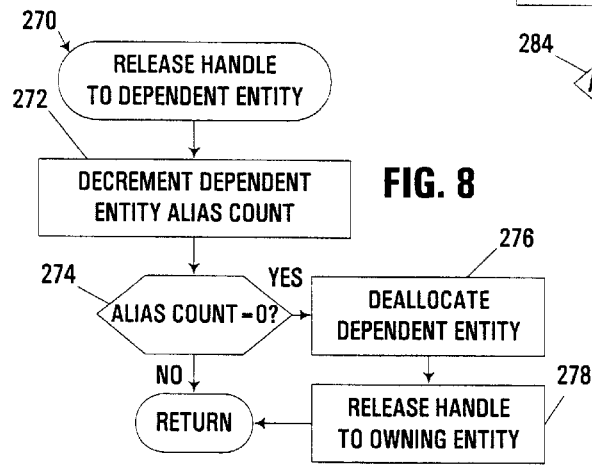
FIG. 8
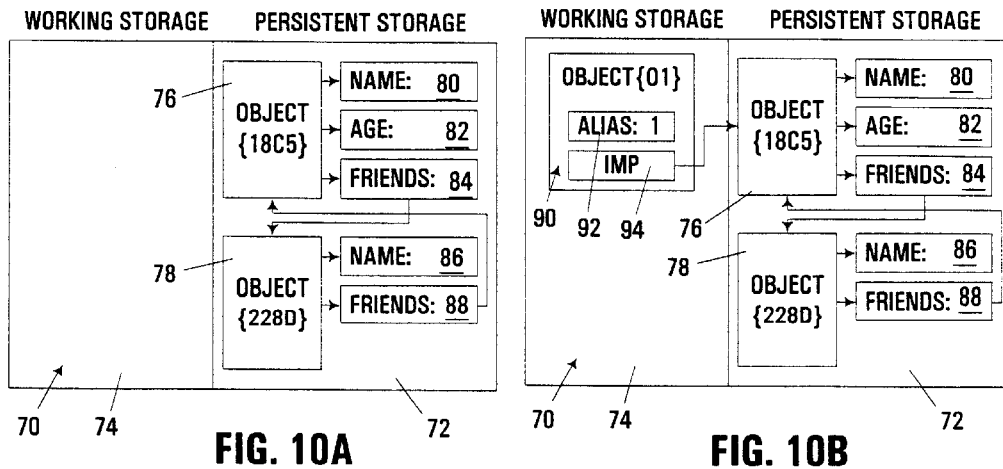
FIG. 10A  FIG. 10B

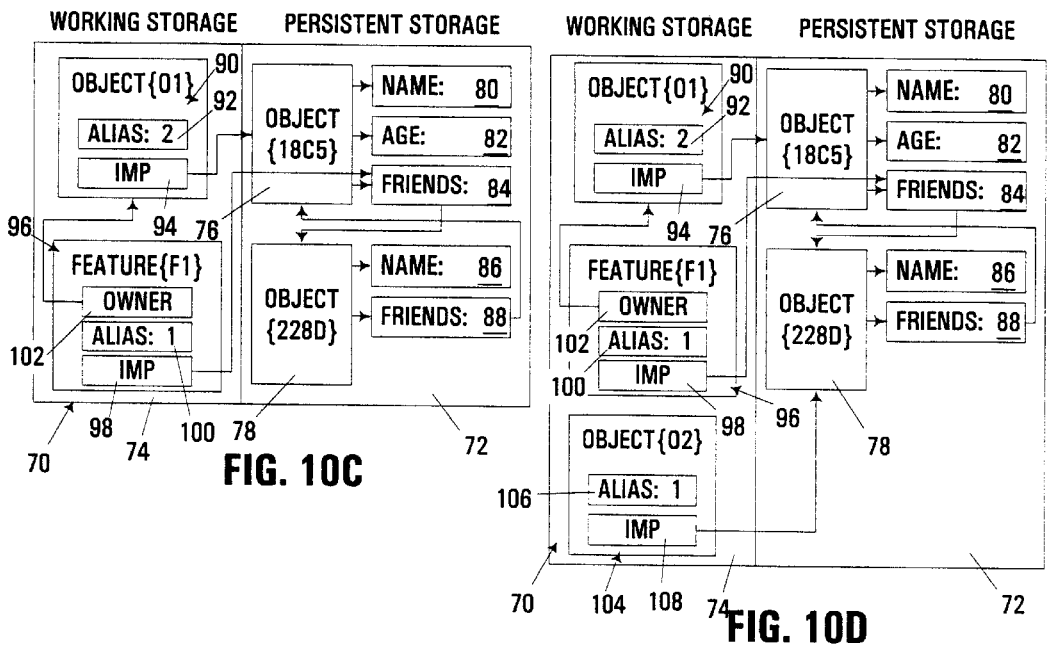
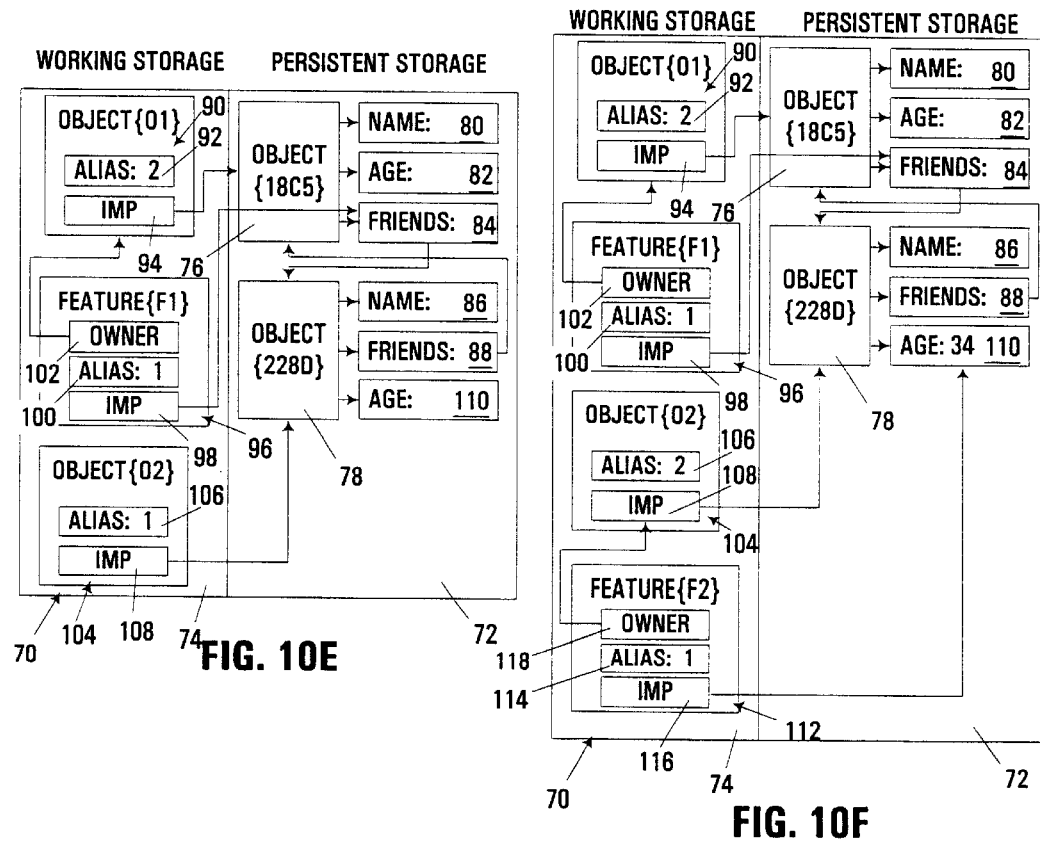

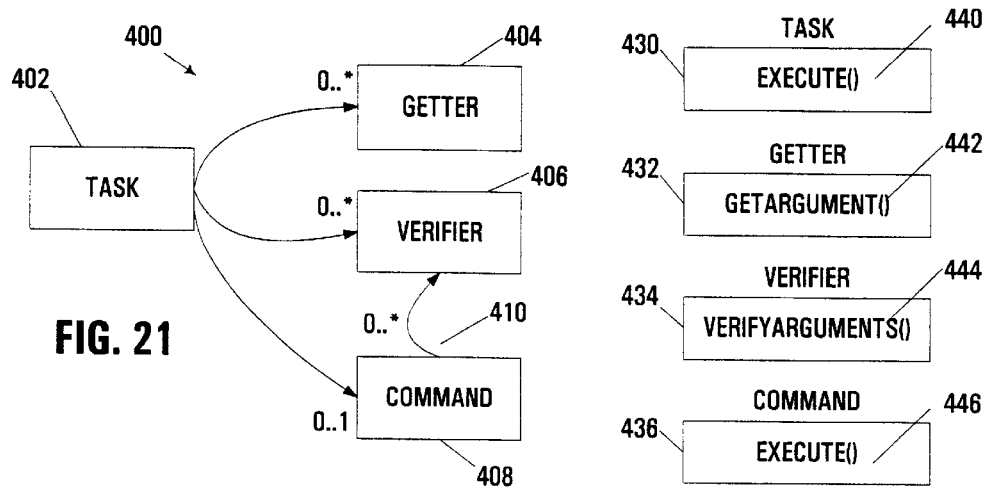
FIG. 21
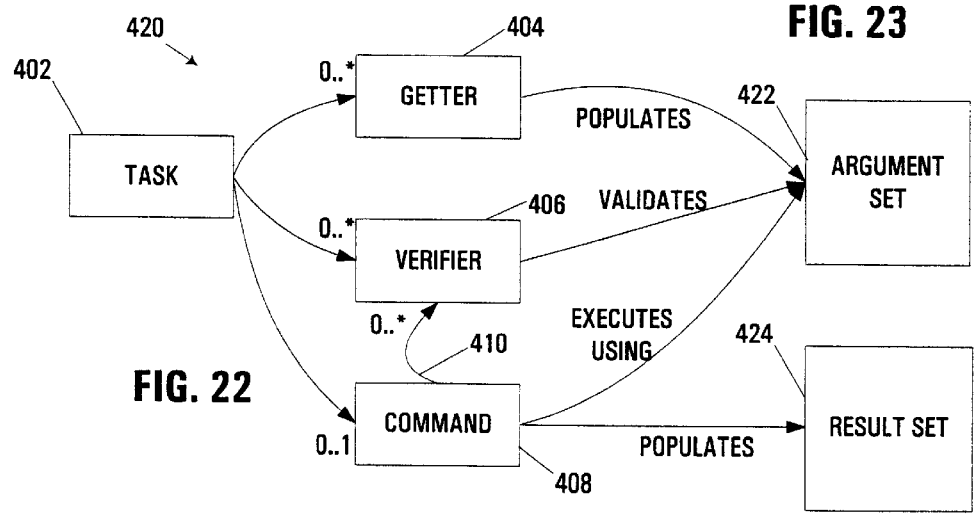
FIG. 22
FIG. 23
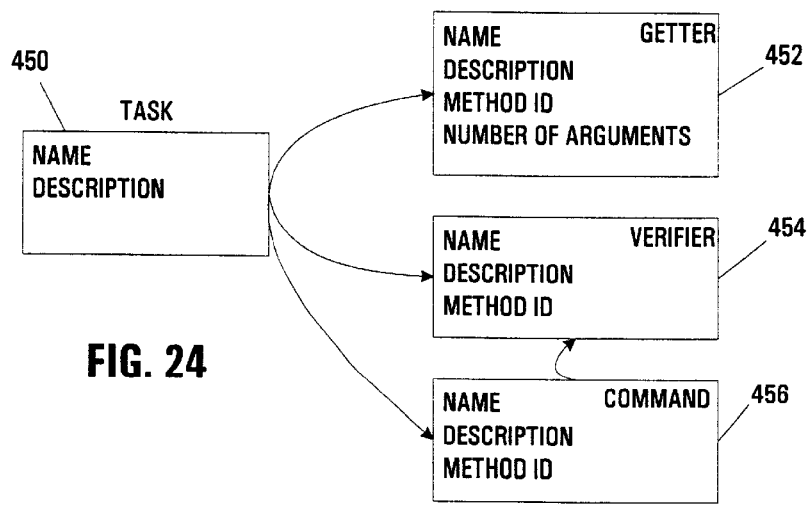
FIG. 24

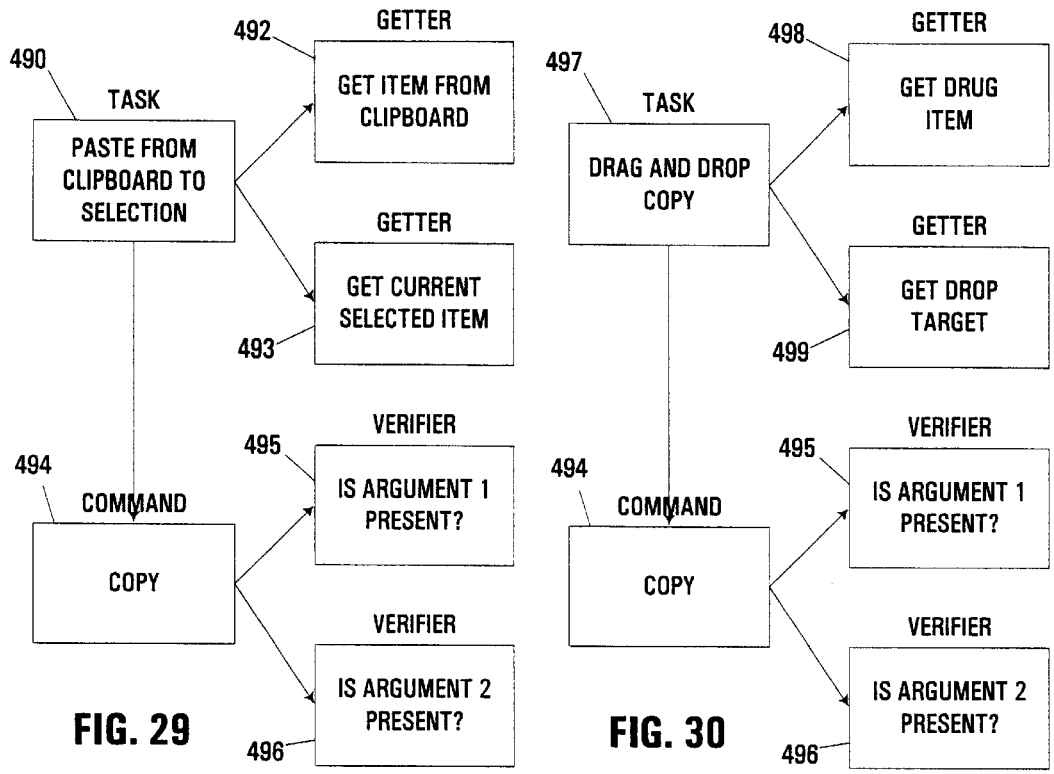
FIG. 29
FIG. 30
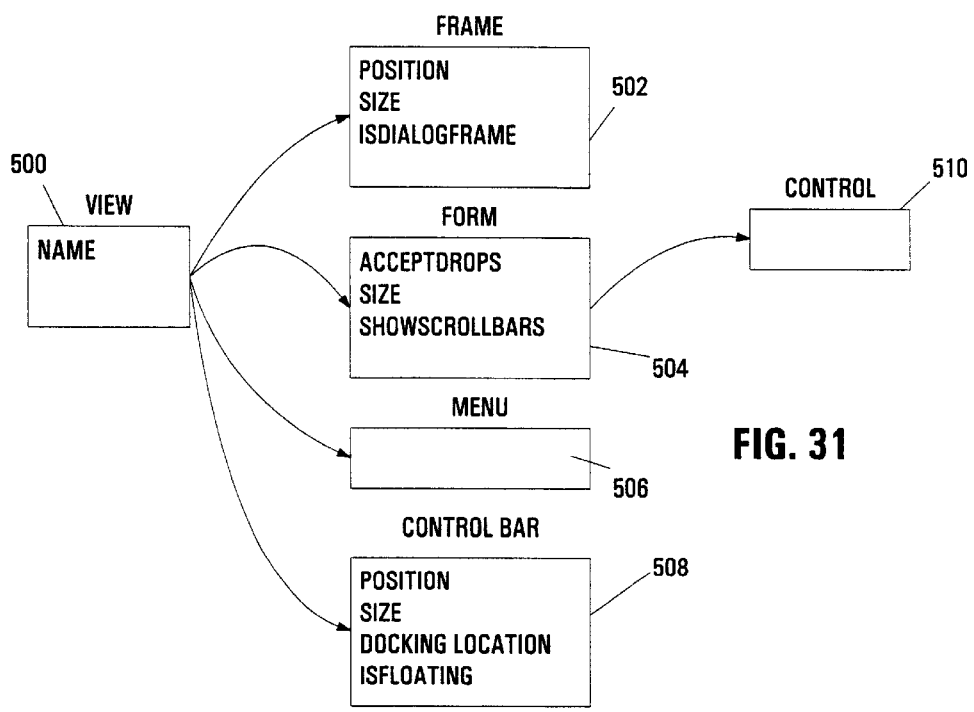
FIG. 31

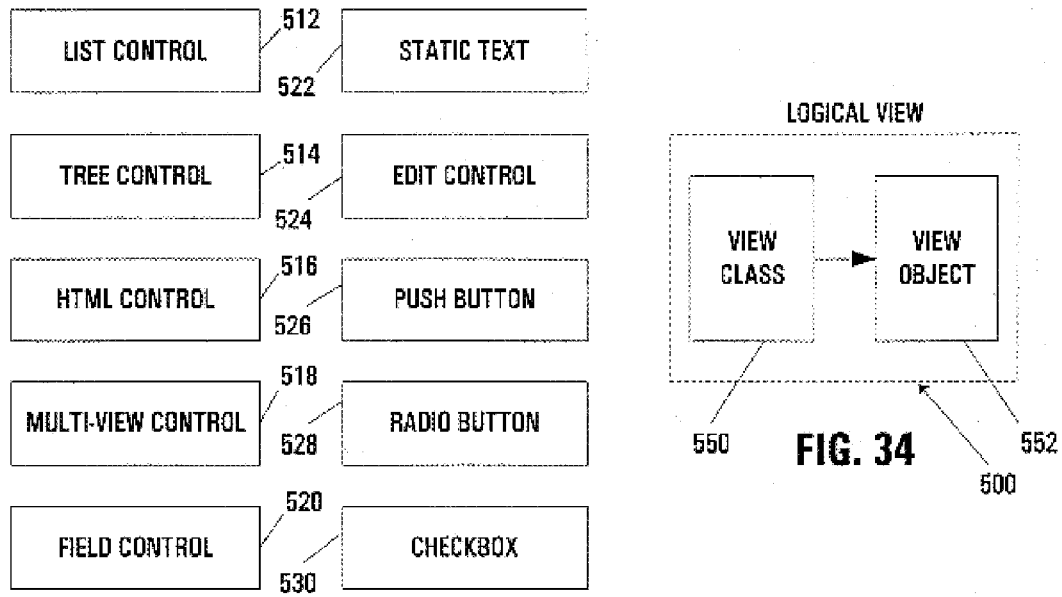
FIG. 32
FIG. 34
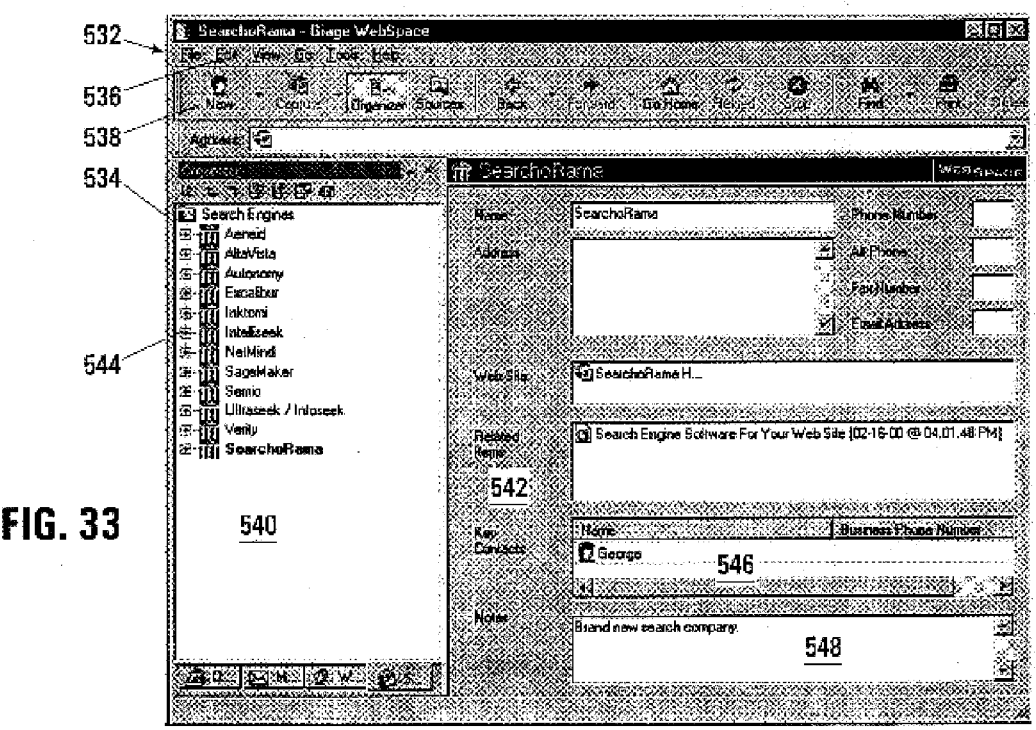
FIG. 33

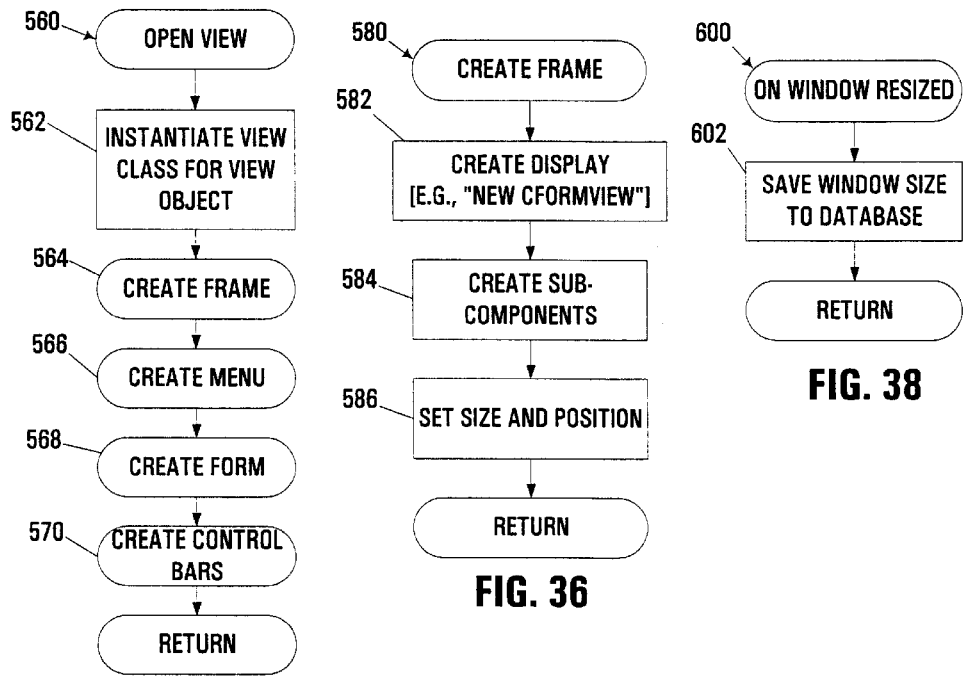
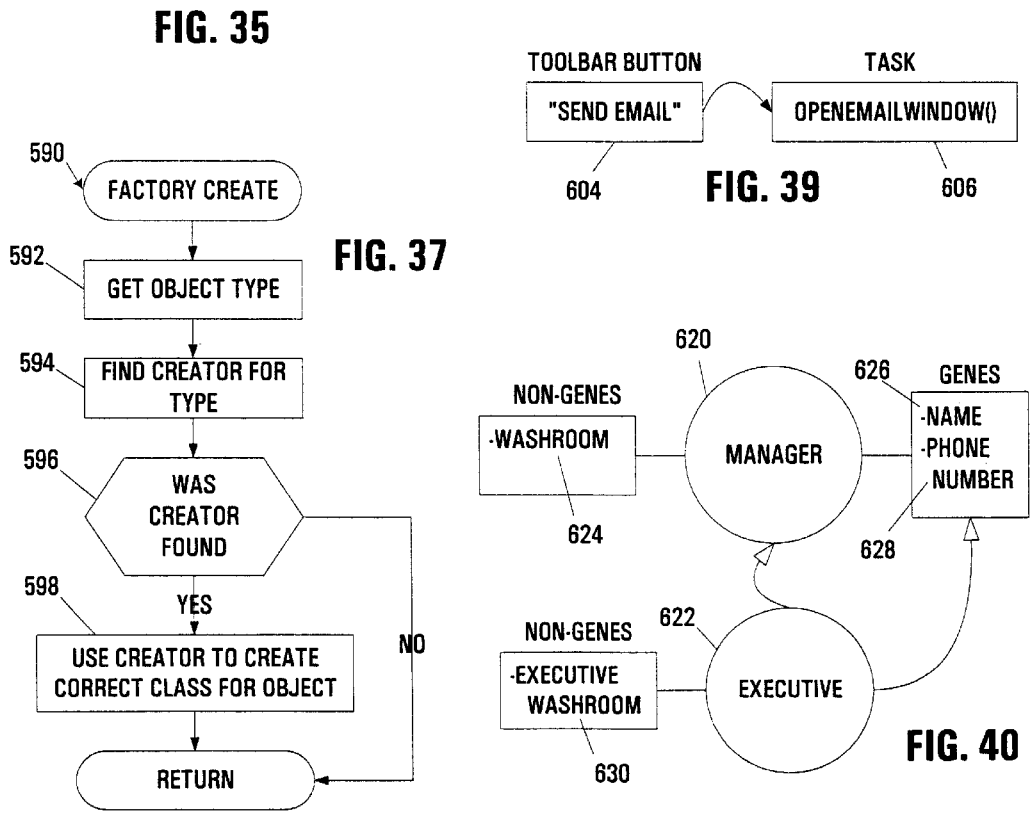

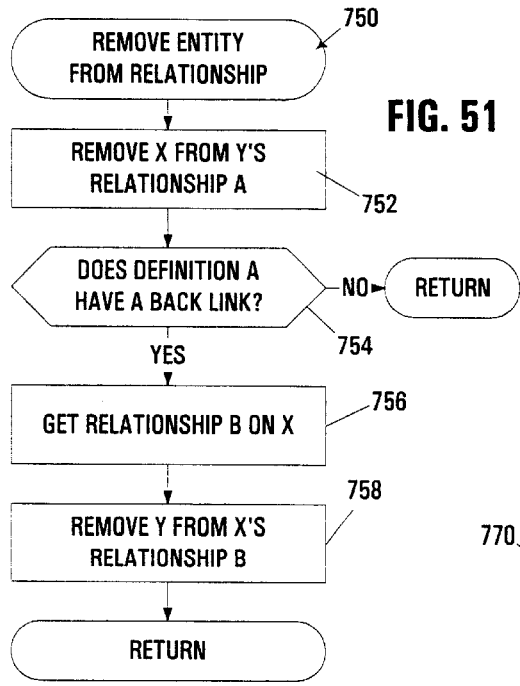
FIG. 51
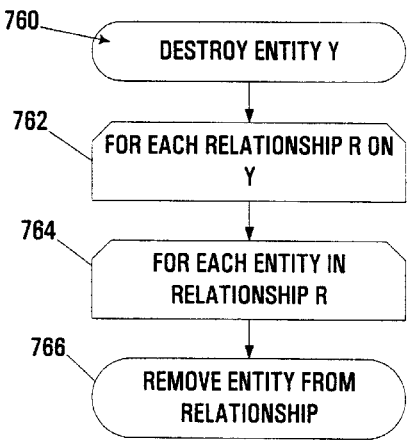
FIG. 52
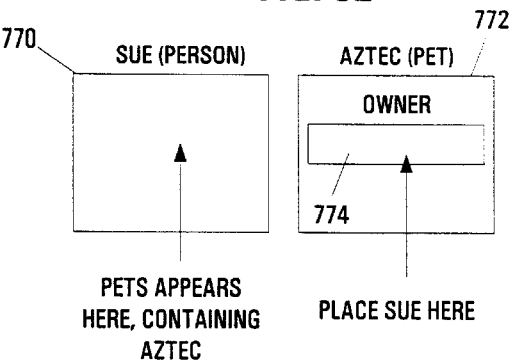
FIG. 53
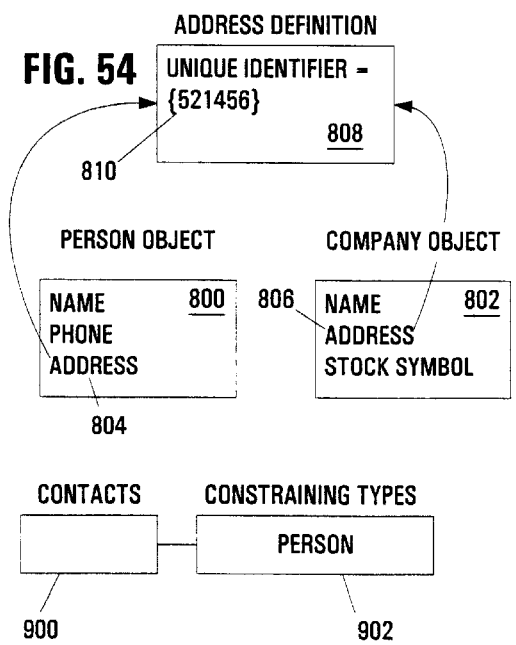
FIG. 54
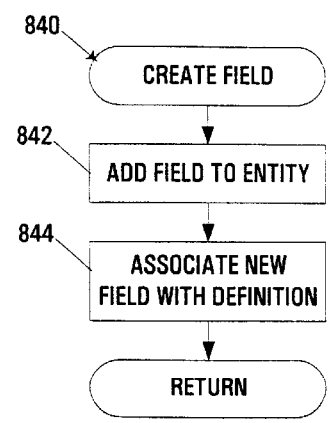
FIG. 56
FIG. 57

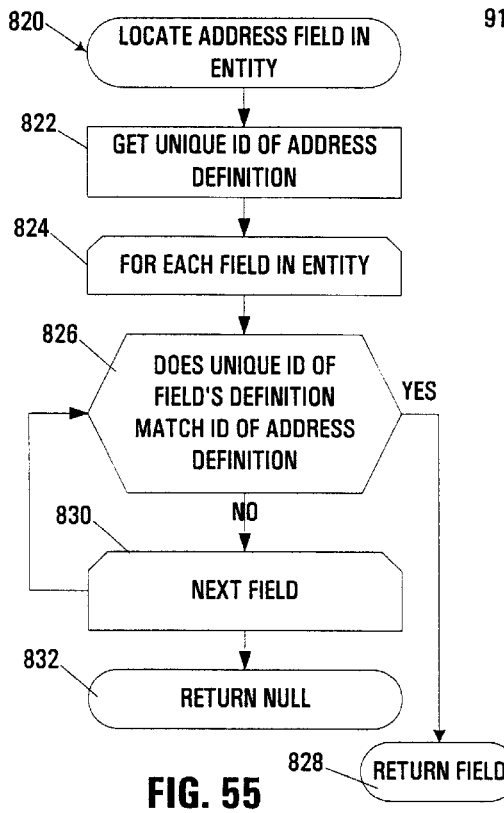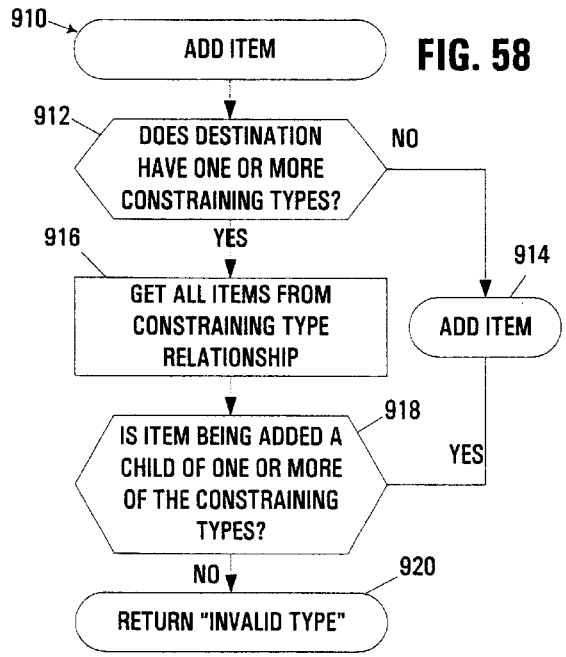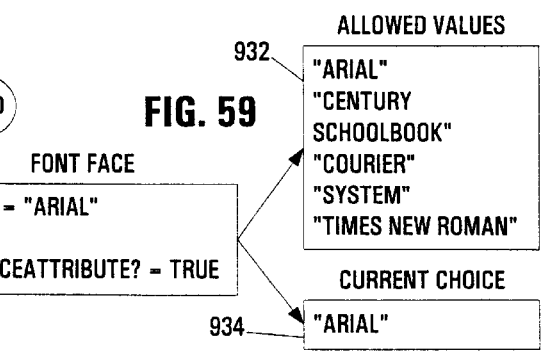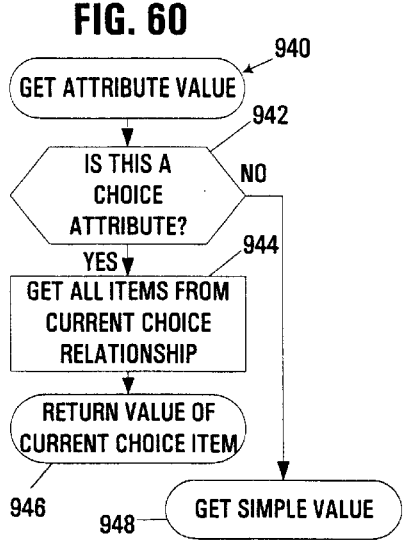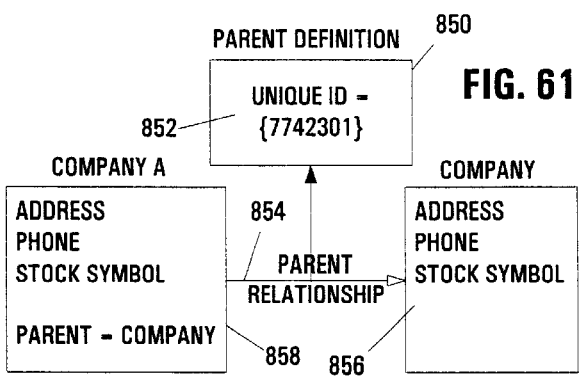
FIG. 55
FIG. 58
FIG. 59
FIG. 60
FIG. 61

SELECTIVE INHERITANCE OF OBJECT PARAMETERS IN OBJECT-ORIENTED COMPUTER ENVIRONMENT

CROSS-REFERENCE TO RELATED APPLICATIONS

This application claims the benefit of U.S. Provisional Application Ser. No. 60/153,651, filed Sep. 13, 1999, the disclosure of which is incorporated by reference herein. Moreover, this application is related to the following co-pending applications, all of which were filed on even date herewith by Timm O. Martin: U.S. Ser. No. 09/660,893 (entitled "MEMORY MANAGEMENT OF PROGRAM ENTITIES UTILIZING AUTOMATED PERSISTENCE AND ENTITY USAGE MONITORING"), U.S. Ser. No. 09/660,892 (entitled "TASK-ORIENTED EXECUTION MODEL"), U.S. Ser. No. 09/660,891 (entitled "IMPLICIT INHERITANCE OF OBJECT PARAMETERS IN OBJECT-ORIENTED COMPUTER ENVIRONMENT"), Ser. No. 09/660,739 (entitled "DATA-DRIVEN USER INTERFACE MODEL"), and U.S. Ser. No. 09/660,896 (entitled "DYNAMIC RELATIONSHIPS BETWEEN ENTITIES IN OBJECT-ORIENTED COMPUTER ENVIRONMENT"). The disclosures of all of these co-pending applications are also incorporated by reference herein.

FIELD OF THE INVENTION

The invention is generally related to computers and computer software. More specifically, the invention is generally related to programming languages and computer management of logical entities such as objects and the like.

BACKGROUND OF THE INVENTION

Translating human knowledge into computerized form to enable a computer to perform a useful task is a difficult problem that has existed since the advent of computers. Humans tend to think in terms of abstract concepts and the meanings behind such concepts, while computers are more literal in nature, expecting specific inputs and outputting specific responses to such inputs. To bridge the gap between humans that desire to perform tasks, and the computers that ultimately perform those tasks, often skilled program developers are required to develop computer programs that minimize the level of skill required by end users. Whereas at the beginning of the computer revolution, computer programs were rudimentary in nature, and required extensive skill on the part of end users, computer technology has now evolved to the point that computer programs are much more complex, often making computers much simpler to use. In addition, new development tools are constantly being developed to relieve the burden on developers so that, rather than having to construct a computer program from the ground up, the developer can rely on pre-existing components to impart high-level functionality to a computer program.

As a result of these advancements, the level of skill required to both develop and use computer programs continues to decrease. Consequently, computer technology has become more useful to a wider number of people. A need still continues to exist, however, for a manner of further simplifying the control of computers in performing useful tasks.

Computer programs are generally developed based upon computer languages, which essentially permit humans to develop computer programs in more human-centric manner. Computer languages typically exist only in the abstract; however, the concepts of the languages are implemented in software that is used in the development and execution of computer programs that follow the "rules" defined by the languages.

The ultimate goal of any computer language, as well as the underlying software that implements the computer language, is to simplify the development of computer programs. As such, the value of a computer language is generally gauged based on the ease in which the language can be used by a program developer to create new programs, or to modify existing programs to suit their needs. The ease of use of a computer language is typically dependent on the often competing goals of expressiveness and intuitiveness.

The expressiveness of a computer language represents the ability for a language to express different concepts in terms suitable for execution on a computer. In essence, the more expressive a language is, the greater the functionality and flexibility of the language.

Intuitiveness, on the other hand, reflects the ease in which abstract, human-centric concepts can be represented by a language. When a language is easier to understand, the learning curve associated with developing programs in that language is lower, as is the required level of skill for a developer.

One aspect of a computer language that weighs heavily on the expressiveness and intuitiveness of the language is the number and types of core semantic elements used by the language. In particular, despite the wide differences in computer languages, at the very essence, every computer language relies on a set of core semantic entities that represent the basic "words" for the language. Just as the words in a dictionary form the core elements for the English language from which all communication in the English language is derived, the core semantic entities for a computer language are the basic elements from which all programmatic concepts are constructed.

As the number of core semantic elements used in a language increases, in general the expressiveness of the language increases, while the intuitiveness decreases. In a low-level and rudimentary language such as machine language, for example, the basic core language entities are typically the actual microprocessor instructions executed by the computer, which are rarely intuitive to humans. More complex and abstract object-oriented programming languages such as c++ come closer to providing intuitiveness, but these languages are also quite large, offering dozens if not hundreds of key semantic entities, many of which are very low level and still require extensive effort on the part of individual developers to support more abstract concepts.

At the opposite end of the spectrum, some languages such as LISP and SELF have been defined with a restricted number of basic semantic entities. For LISP, as an example, only two basic semantic entities are supported: lists and list elements. In SELF, the basic semantic entities are objects and slots. It has been found, however, that having too few basic entities also compromises expressiveness, as some conceptual constructs may not be capable of being represented in literal computer instructions. Often, intuitiveness is also hampered because the logical leap necessary to represent conceptual constructs using only a few semantic entities may be too great for an inexperienced developer.

Therefore, a significant need continues to exist in the art for a computer language that implements a more useful set of core semantic entities that is capable of providing greater expressiveness and intuitiveness than is available from conventional computer languages.

Another aspect associated with simplifying the development process of computer programs is the ease in which programs can be transitioned from the development stage to the execution stage. For example, many computer languages utilize separate development and runtime environments. In the development environment, a developer writes a program in a source code representation and compiles the program into an executable representation. The runtime environment is used to execute the program, and may include debug capabilities to permit the developer to identify errors in the program. A developer must switch between the environments to revise a program and eliminate any errors found during debugging. Such separation of development and runtime environments, however, often complicates the development process.

Other languages support integrated development and runtime environments, whereby development of a program, as well as execution of the program, can be performed in the same environment. As a result, task switching between separate environments is eliminated, often streamlining the development process.

Furthermore, regardless of whether development and runtime environments are integrated, both environments are subject to concerns as to efficiently managing information in a computer environment, particularly in those environments that rely on an underlying database application.

Inheritance, for example, is a central mechanism of object oriented software engineering. Inheritance supports reuse, by placing common fields and behaviors into a "parent" entity. These common elements are then inherited into one or more "child" entities. This reduces the amount of work required to define the child entities, since the common elements only need to be defined one time in the parent, rather than defined separately for each child. As a result, the likelihood of error is reduced; and if an error is made in defining the common elements, the error only needs to be fixed in one place, on the parent, rather than needing to be fixed many times. The result is that systems using inheritance are generally less expensive to build and to maintain.

A common problem facing inheritance is that of restricting the inheritance of certain elements. During development of real-world systems, parent entities often hold information or behaviors that should not be inherited into children. These fields are often used for bookkeeping, such as tracking the number of instances of a particular class, or keeping a list of all such instances. Existing object oriented languages support the ability to restrict inheritance, for example, through the use of "private" elements, which are physically inherited into child classes (that is, increase the physical size of the child class), but which cannot be accessed (neither read nor modified) by the child.

One limitation of existing inheritance restriction methods is that they are designed to work with objects in memory, and do not directly support the persistence of information in a database. Changing which fields are to be restricted from being inherited in a database, whether a relational or an object-oriented database, would require changing the database schema, which can be an expensive undertaking, potentially requiring that the affected databases be taken off-line. In fact, relational databases do not natively support inheritance whatsoever, and require special application logic to mimic inheritance functionality.

Therefore, a need exists in the art for a manner of restricting the inheritance of fields and other parameters of an object-oriented entity, in particular in applications that rely on underlying databases and the persistent storage of object-oriented entities.

SUMMARY OF THE INVENTION

The invention addresses these and other problems associated with the prior art by providing an apparatus, program product, and method of managing entities in an object-oriented environment in which parameters or fields are selectively inherited from parent entities and into child entities responsive to persistent indications of the inheritability of such parameters or fields stored in a non-volatile memory. Further, in many implementations, basing a determination of inheritability on such persistent information permits inheritance to be selectively restricted for a parameter or field without requiring any changes to the database schema for a database that controls access to the parent and child entities.

Consistent with the invention, entities from an object-oriented environment in a computer system are managed by creating a child entity based on a parent entity for which a persistent representation has been created in a non-volatile memory in the computer system. Further, the non-volatile memory is accessed to determine whether a parameter for the parent entity is inheritable. In addition, the parameter is inherited into the child entity if the parameter for the parent entity is determined to be inheritable.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 7 is a flowchart illustrating the program flow of a release handle to entity routine capable of being executed by the entity management system of FIG. 3.

FIG. 8 is a flowchart illustrating the program flow of a release handle to dependent entity routine capable of being executed by the entity management system of FIG. 3.

FIG. 9. is a flowchart illustrating the program flow of a release handle to reference entity routine capable of being executed by the entity management system of FIG. 3.

FIGS. 10A–10G are block diagrams illustrating the memory management of a plurality of exemplary program entities in the entity management system of FIG. 3.

FIG. 21 is a block diagram of a persistent structure of a task consistent with the invention.

FIG. 22 is a block diagram of an execution mode of a task consistent with the invention.

FIG. 23 is a block diagram of architecture classes for a task consistent with the invention.

FIG. 24 is a class diagram illustrating the structure of persistent objects within a task consistent with the invention.

FIG. 29 is a block diagram of an exemplary paste from clipboard to selection task consistent with the invention.

FIG. 30 is a block diagram of an exemplary drag and drop copy task consistent with the invention, and illustrating entity reuse from the task of FIG. 29.

FIG. 31 is a block diagram of a persistent structure of a view consistent with the invention.

FIG. 32 is a block diagram of a number of user interface control classes for use in a view consistent with the invention.

FIG. 33 is a block diagram of an exemplary display representation of a view consistent with the invention.

FIG. 34 is a block diagram illustrating the relationship between a view class and a view object in a logical view.

FIG. 35 is a flowchart illustrating the program flow of an open view routine executed by the user interface model of FIG. 3 during creation of a view consistent with the invention.

FIG. 36 is a flowchart illustrating the program flow of the create frame routine referenced in FIG. 35.

FIG. 37 is a flowchart illustrating the program flow of a factory create routine executed by the execution model of FIG. 3 to associate a class with an object consistent with the invention.

FIG. 38 is a flowchart illustrating the program flow of an on window resized routine executed by the execution model of FIG. 3 in response to a window resize operation on a view consistent with the invention.

FIG. 39 is a block diagram illustrating the relationship between a user interface model control entity and an execution model task consistent with the invention.

FIG. 40 is an object diagram illustrating an exemplary use of selective inheritance consistent with the invention.

FIG. 51 is a flowchart illustrating the program flow of a remove entity from relationship routine executed by the entity management system of FIG. 3.

FIG. 52 is a flowchart illustrating the program flow of a destroy entity routine executed by the entity management system of FIG. 3.

FIG. 53 is a block diagram illustrating the operation of the add entity to relationship routine of FIG. 50 on an exemplary pair of entities.

FIG. 54 is a block diagram illustrating the use of a feature definition entity to define associated features from multiple entities in the entity management system of FIG. 3.

FIG. 55 is a flowchart illustrating the program flow of a locate address field in entity routine executed by the entity management system of FIG. 3.

FIG. 56 is a flowchart illustrating the program flow of a create field routine executed by the entity management system of FIG. 3.

FIG. 57 is a block diagram of a relationship entity that is type constrained by a constraining types relationship definition in the entity management system of FIG. 3.

FIG. 59 is a flowchart illustrating the program flow of an add item routine executed by the entity management system of FIG. 3, and configured to support constrained types.

FIG. 59 is a block diagram of a choice attribute entity defined within the entity management system of FIG. 3.

FIG. 60 is a flowchart illustrating the program flow of a get attribute value routine executed by the entity management system of FIG. 3, and configured to support choice attributes.

FIG. 61 is a block diagram of a parent definition entity used to seed a database in the entity management system of FIG. 3.

DETAILED DESCRIPTION

Figure 1:
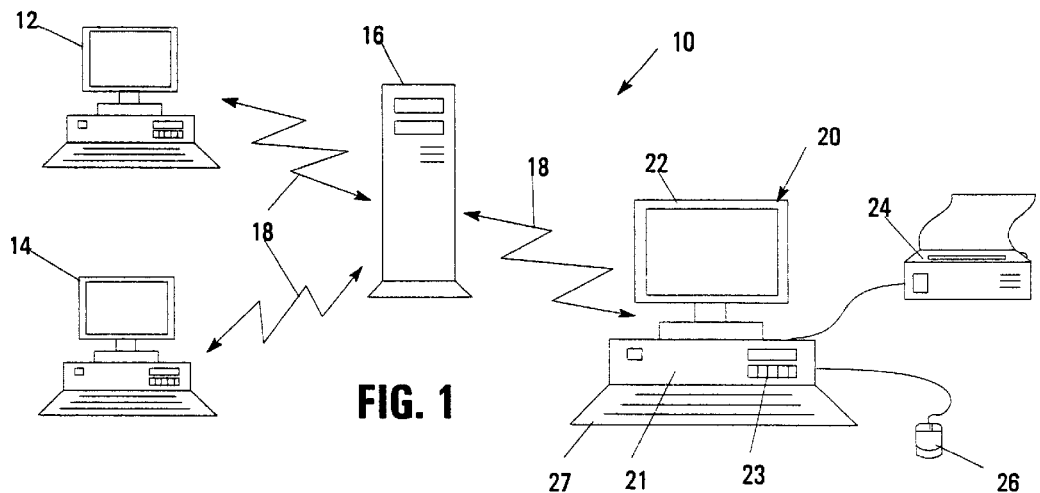
FIG. 1 is a block diagram of a networked computer system consistent with the invention.

The various aspects of the invention are hereinafter described and illustrated in the context of an integrated development and runtime environment incorporating a high-level object-oriented language and a generic user interface construction kit that is fully configurable at runtime. Prior to discussing the integrated development and runtime environment in greater detail, however, a conceptual overview is presented of a desirable epistemology, upon which a number of the various aspects of the invention discussed below are based.

Conceptual Overview

In the illustrative embodiments of the invention, a computer language is designed to be based upon six primitive semantic entity classifications. It is believed that such classifications represent an optimal set of types of program entities that are suitable for providing a fully expressive language that is both intuitive for humans and still simple enough to support easy translation into the realm of computer software. However, in certain implementations, one or more of such entity classifications may be omitted, and/or other basic entity classifications may be added.

The program entities utilized in the illustrated embodiments may be considered to incorporate practically any data structure suitable for representing a logical object in an object-oriented programming environment. The six basic entity classifications, from which all program entities are constructed in the illustrated embodiments below, are as follows:

Objects—Stand-alone program entities representing the fundamental building blocks of the language. An object can alias various feature entities such as attributes, behaviors, relationships, and references that serve to describe the object.

Definitions—Stand-alone program entities that serve to define and differentiate one type of feature entity from another. Through definitions, feature entities can be accessed programmatically, e.g., to permit software requests to be made of the form "Get me all the 'Age' attributes from this set of 50 objects."

Attributes—Feature entities that hold some value and type information. The value could be a number, a message, a date, time, a picture or sound clip, etc.

Behaviors—Feature entities that represent an action that an object can perform.

References—Feature entities that point to or "alias" an object or another feature entity such as an attribute, behavior, or relationship. References permit, for example, the same object or feature entity to be put into multiple places, and accessed in the same manner from those different places. Through suitable management protocols (discussed below), users need not distinguish between a reference and the entity being referenced, yet additional features can be added to a reference, which would not appear on the entity being referenced, but only on that particular reference.

Relationships—Feature entities that hold a set of references. It is believed that relationships are a fundamental part of translating human understanding and expression into a generic software epistemology, by generally defining at a fundamental level the relationships that can exist between different entities, thereby serving to group "related" entities together.

The above-described entity classifications are supported by an entity management system that defines a number of rules with which all program entities must conform. First, features are required to be "owned" by another entity in the system. Ownership in this context means that the lifetime of an "owned" entity is determined by the lifetime of the entity owning that entity. Hence, an entity management system consistent with the invention is typically configured to automatically terminate or discard an owned entity in response to termination of its owning entity.

Second, each entity, whether an object, definition or feature, is capable of owning another entity. Put another way, every entity is also a container.

Third, entities are accessible in the same manner regardless of what particular chains of references are used to access such entities. From a user's perspective, there is no conceptual distinction between an original entity and the references to that entity. As such, an entity management system is typically configured to always operate on the original entity.

Fourth, entities are automatically persistable—that is, modifications made to an entity (whether to the contents or the actual structure) are automatically persisted to non-volatile memory (e.g., mass storage) in response to such modifications. Automatic persistence is supported natively, rather than requiring a software programmer to specifically insert instructions for saving entity modifications either explicitly, or simply saving a workspace of entities only upon shutdown of an entity management system.

Using the epistemology discussed above, a number of unique functionalities may be supported in different applications. For example, an integrated development and runtime environment may be supported whereby entities may be created, modified, and destroyed dynamically, and without the need to perform compilation to effect changes. In effect, a run-time development programming methodology may be supported, often through assembling, duplicating and configuring existing entities, and without the need for writing actual program code. Application development as a result is much faster, and significantly easier to learn and use by non-programmers.

Also, a task-based execution model may be supported whereby computer operations are conceptually organized as tasks that are assembled from pools of information retrieval components, verification components and command components, based upon the aforementioned epistemology. Moreover, when used in a dynamic environment, tasks may be created, modified and destroyed dynamically.

In addition, a flexible yet powerful user interface model may be supported whereby user interface components are defined by underlying entities based upon the aforementioned epistemology. Furthermore, when used in a dynamic environment, user interface components can be dynamically modified to support different or customized functionality.

The various aspects of the invention will now be described in the context of an exemplary entity management system implemented in a integrated development and runtime environment. The aforementioned aspects, as well as other aspects that will be apparent to one of ordinary skill in the art having benefit of this disclosure, will become more apparent from the discussion of this exemplary embodiment. However, it will be appreciated that the various aspects may be implemented in different combinations in other environments, and as such, the invention is not limited to the particular implementations discussed herein.

Exemplary Hardware and Software Environment

Turning to the Drawings, wherein like numbers denote like parts throughout the several views, FIG. 1 illustrates a computer system 10 consistent with the invention. Computer system 10 is illustrated as a networked computer system including one or more client computers 12, 14 and 20 (e.g., desktop or PC-based computers, workstations, etc.) coupled to server 16 (e.g., a PC-based server, a minicomputer, a midrange computer, a mainframe computer, etc.) through a network 18. Network 18 may represent practically any type of networked interconnection, including but not limited to local-area, wide-area, wireless, and public networks (e.g., the Internet). Moreover, any number of computers and other devices may be networked through network 18, e.g., multiple servers.

Client computer 20, which may be similar to computers 12, 14, may include a central processing unit (CPU) 21; a number of peripheral components such as a computer display 22; a storage device 23; a printer 24; and various input devices (e.g., a mouse 26 and keyboard 27), among others. Server computer 16 may be similarly configured, albeit typically with greater processing performance and storage capacity, as is well known in the art.

Figure 2:
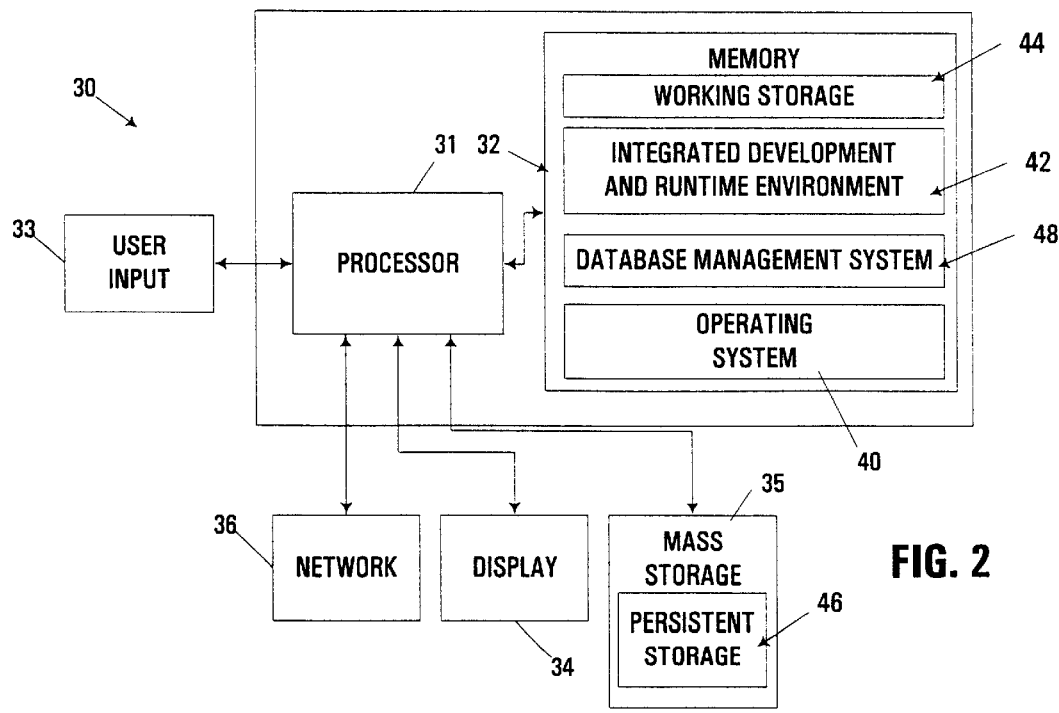
FIG. 2 is a block diagram of an exemplary hardware and software environment for a computer from the networked computer system of FIG. 1.

FIG. 2 illustrates in another way an exemplary hardware and software environment for an apparatus 30 consistent with the invention. For the purposes of the invention, apparatus 30 may represent practically any type of computer, computer system or other programmable electronic device, including a client computer (e.g., similar to computers 12, 14 and 20 of FIG. 1), a server computer (e.g., similar to server 16 of FIG. 1), a portable computer, a handheld computer, an embedded controller, etc. Apparatus 30 may be coupled in a network as shown in FIG. 1, or may be a stand-alone device in the alternative. Apparatus 30 will hereinafter also be referred to as a "computer", although it should be appreciated the term "apparatus" may also include other suitable programmable electronic devices consistent with the invention.

Computer 30 typically includes at least one processor 31 coupled to a memory 32. Processor 31 may represent one or more processors (e.g., microprocessors), and memory 32 may represent the random access memory (RAM) devices comprising the main storage of computer 30, as well as any supplemental levels of memory, e.g., cache memories, non-volatile or backup memories (e.g., programmable or flash memories), read-only memories, etc. In addition, memory 32 may be considered to include memory storage physically located elsewhere in computer 30, e.g., any cache memory in a processor 31, as well as any storage capacity used as a virtual memory, e.g., as stored on a mass storage device 35 or on another computer coupled to computer 30 via network 36.

Computer 30 also typically receives a number of inputs and outputs for communicating information externally. For interface with a user or operator, computer 30 typically includes one or more user input devices 33 (e.g., a keyboard, a mouse, a trackball, a joystick, a touchpad, and/or a microphone, among others) and a display 34 (e.g., a CRT monitor, an LCD display panel, and/or a speaker, among others).

For additional storage, computer 30 may also include one or more mass storage devices 35, e.g., a floppy or other removable disk drive, a hard disk drive, a direct access storage device (DASD), an optical drive (e.g., a CD drive, a DVD drive, etc.), and/or a tape drive, among others. Furthermore, computer 30 may include an interface with one or more networks 36 (e.g., a LAN, a WAN, a wireless network, and/or the Internet, among others) to permit the communication of information with other computers coupled to the network. It should be appreciated that computer 30 typically includes suitable analog and/or digital interfaces between processor 31 and each of components 32, 33, 34, 35 and 36 as is well known in the art.

Computer 30 operates under the control of an operating system 40, and executes or otherwise relies upon various computer software applications, components, programs, objects, modules, data structures, etc. (e.g., integrated development and runtime environment 42, working storage 44, persistent storage 46 and database management system 48, among others). Moreover, various applications, components, programs, objects, modules, etc. may also execute on one or more processors in another computer coupled to computer 30 via a network 36, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions will be referred to herein as "computer programs", or simply "programs". The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Those skilled in the art will recognize that the exemplary environments illustrated in FIGS. 1 and 2 are not intended to limit the present invention. Indeed, those skilled in the art will recognize that other alternative hardware and/or software environments may be used without departing from the scope of the invention.

Figure 3:
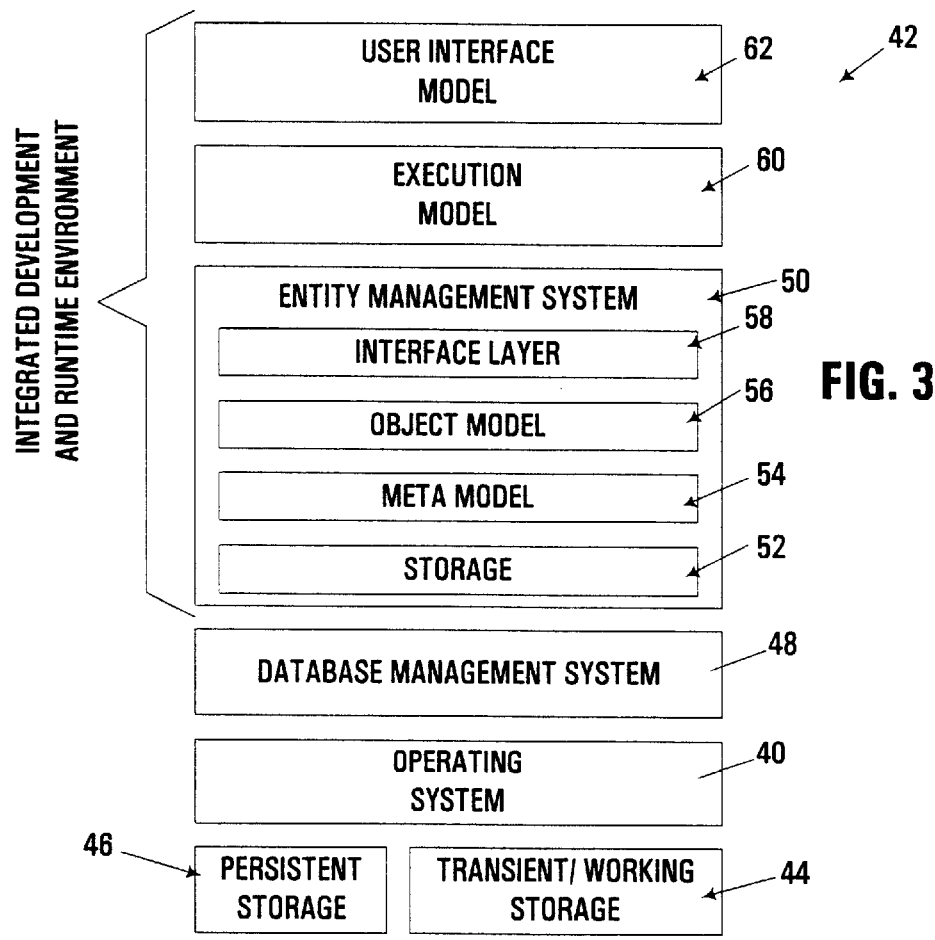
FIG. 3 is a block diagram of the primary software components in the computer of FIG. 2.

FIG. 3 illustrates in another way the primary software components utilized in computer system 30. Specifically, integrated runtime and development environment 42 is based upon the manipulation of logical entities, or data elements, representing the basic building blocks from which applications are developed. A database partitioned into transient (or working) and persistent storage 44, 46 is utilized to store all entities. To maximize performance, entities are typically manipulated using representations thereof stored in working storage 44, with modifications made to such representations of those entities automatically persisted to persistent representations thereof stored in persistent storage 46.

Persistent storage 46 may be implemented using any type of non-volatile storage medium, e.g., a local or networked mass storage device, a non-volatile solid state memory array, or in a removable storage medium such as a floppy disk, an optical disk or the like. Working storage 44, on the other hand, may either be non-volatile or volatile in nature, so long as higher speed access is provided compared to persistent storage 46. Typically, working storage 44 is implemented in the random access memory arrays of a computer, including the main memory as well as any cache memories utilized to improve the performance of the computer.

Operating system 40 supports basic input/output functions for creating, accessing, modifying, destroying and otherwise manipulating entities stored in transient/working storage 44 and persistent storage 46. Operating system 40 may be implemented using any number of known operating system platforms, e.g., the Windows family of operating systems from Microsoft Corporation, the MacOS operating system from Apple Computer, or any of the various implementations of UNIX and Linix, among others. A database management system (DBMS) 48 accesses the functionality of operating system 40 in a known manner to organize and structure access to the entities stored in storage 44, 46. Likewise, database management system 48 supports a set of functions for use by integrated development and runtime environment 42 to manipulate the logical entities stored in the database. Any number of known database management systems (e.g., various object-oriented and relational database management systems) may be utilized, e.g., the ObjectStore or the ObjectStore PSE Pro object-oriented database management systems available from Object Design, Inc.

Integrated development and runtime environment 42 includes an entity management system 50 partitioned into a storage layer 52, a meta model layer 54, an object model layer 56 and an interface layer 58. Layered over system 50 is an execution model layer 60 and a user interface model layer 62.

Storage layer 52 essentially acts as an interface to the underlying database, thereby hiding the details of the underlying database interface from the higher layers of the integrated development and runtime environment. Through appropriate design of storage layer 52, different underlying database systems may be supported. It will be appreciated that the design of an interface layer to support practically any database engine is well within the ability of one of ordinary skill in the art having the benefit of the instant disclosure.

Meta model layer 54 encapsulates the above-described epistemology by defining the basic entity classifications. As will also become more apparent below, layer 54 also supports the features of automated persistence and event-notification.

Object model layer 56 implements a full object-oriented, high-level programming language built on the basic entity classifications defined in layer 54. As will also become more apparent below, additional functionality, including but not limited to inheritance, constraints, composition, and bi-directional relationships, is implemented in object model layer 56.

Interface layer 58 essentially functions as a wrapper to provide a standard application programming (API) interface to external developers, thereby preserving the integrity of the underlying entity management system layers. The construction of such an interface is also be well within the ability of one of ordinary skill in the art having the benefit of the instant disclosure.

Execution model layer 60 provides task-oriented functionality for developers, whereby preexisting functional components are assembled together to perform specific tasks utilizing the underlying entities managed by entity management system 50. These tasks are then utilized by user interface model 62 to user interface components such as menu items, toolbar buttons, dialog boxes, and the like to be defined and associated with specific tasks defined at execution model layer 60. Through user interaction with the user interface components supported in user interface model 62, custom applications may be developed and executed by developers and users alike, supporting integrated development and runtime execution of user applications.

The principal aspects of the invention, and the implementations thereof in the aforementioned software components, are described in greater detail hereinafter.

Memory Management

Memory management in environment 42 is principally implemented in storage layer 52 of entity management system 50, which is hereinafter also referred to as a storage manager. Storage manager 52 handles the management of program entities in memory, principally by maintaining persistent representations of such entities in persistent storage 46, and selectively creating working representations of such entities as needed in working storage 44. As program entities are no longer being accessed, the working representations are discarded and the memory allocated thereto is freed. Moreover, the storage manager automatically persists modifications made to the working representations of the program entities to the persistent representations thereof, thereby maintaining synchronization between the representations.

Storage manager 52 automatically persists modifications to program entities (including structural modifications) specifically in response to modifications to the working representations thereof. This is in contrast to conventional page swapping and caching algorithms, where memory is typically written out of working memory into persistent storage according to a least recently used algorithm as new entities are brought into working memory. By automatically persisting modifications in response to such modifications, more effective synchronization, and thus greater reliability and fault tolerance, are provided. Furthermore, as will become more apparent below, through the use of alias counts within working representations of entities, the storage manager may be capable of managing entities without the use of any separate garbage collection operations, thereby minimizing the overhead associated with memory management activities.

FIGS. 4–9, for example, illustrate a number of entity management routines for use in controlling the creation or retrieval of program entities, as well as the destruction of such entities, to and from working memory. In these routines, it is assumed that three principal entity classifications are used, namely independent entities (also referred to as "objects"), dependent entities (also referred to as "features"), and reference entities (also referred to as "references"). It is also assumed that each dependent entity is "owned" by another entity, and that each reference entity is both "owned" by another entity, and has a "target" entity to which the reference entity provides a reference. Furthermore, for any dependent entity, the independent entity from which that dependent entity ultimately depends, as well as any intervening owning dependent entities, are considered to comprise the "ownership chain" for that dependent entity.

It is also assumed that each working copy of an entity in working storage will have associated therewith an "alias count", used to indicate the number of handles to (or uses of) the entity, thus indicating whether an entity is currently in use. Each alias count is typically local to an entity, although within the local alias count for an entity is represented the total usages of all entities that alias that entity. Put another way, if a particular entity "A" aliases an entity "B", and there are three usages of entity "A", the alias count for entity "B" will reflect such three usages, along with any additional usages of entity "B" that are independent of the usages of entity "A".

Figure 4:
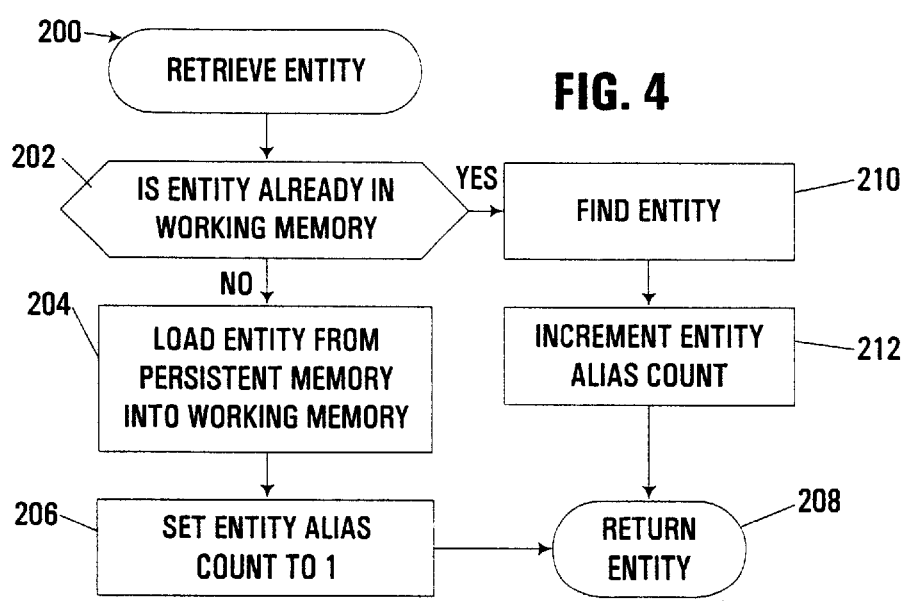
FIG. 4 is a flowchart illustrating the program flow of a retrieve entity routine capable of being executed by the entity management system of FIG. 3.

FIG. 4 shows a retrieve entity routine 200, representing the logic used when an new entity is created or an existing entity is loaded from persistent storage into working memory, each of which may be considered to be a request to use a program entity. Routine 200 begins in block 202 by determining whether the requested entity is already in working memory. It should be appreciated that when a new entity is created, the answer such a query will always be "no." If the entity is not in working memory, control passes to block 204 to load the entity into working memory from persistent storage (or created if it is a new entity). Next, the entity's alias count is set to 1 in block 206, and a handle to the entity is returned in block 208.

If the entity is already in memory, block 202 passes control to block 210 to locate that entity. Control then passes to block 212 to increment the entity's alias count, and then to block 208 to return a handle to the entity.

As will become more apparent below, rather than copying an entity into working memory, an entity may be "retrieved" by creating a wrapper entity functioning as a proxy for the entity. In either case, the software author does not need to perform any steps to allocate memory or increment the entity's alias count. Such tasks are done automatically by the system. Instead, the software author may simply request the entity using one of several possible interfaces, e.g., as discussed below.

Also, as will also become more apparent below, the use of an alias count of 1 may also be subject to some variation. For example, the minimum alias count of an entity that is in use may be 2, e.g., so that the entity management system may maintain an alias to each entity to support a find or other system operation. Such a variation would also affect the logic of releasing entities (as will be discussed below), namely that an entity is released from memory when its alias count drops to 1, rather than when it drops to zero.

Figure 5:
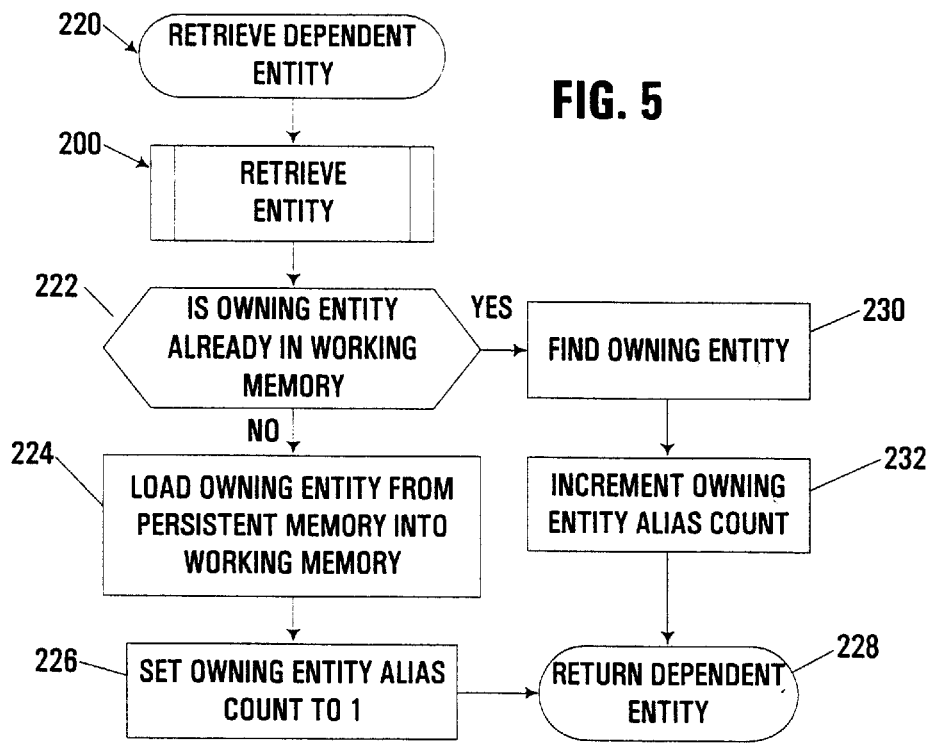
FIG. 5 is a flowchart illustrating the program flow of a retrieve dependent entity routine capable of being executed by the entity management system of FIG. 3.

FIG. 5 shows a retrieve dependent entity routine 220, representing the logic used when retrieving an existing dependent entity (e.g., a Feature) or creating a new one. Routine 220 may begin by retrieving the entity itself using the aforementioned entity retrieval logic of routine 200. However, as part of loading the entity, routine 220 also ensures that its owning entity is also loaded, and effectively creates a handle to that entity, thus "locking" its owning entity in memory so long as the dependent entity is also in memory. Specifically, blocks 222–226 and 230–232 of routine 220 essentially follow the program flow of blocks 202–206 and 210–212 to either load the owning entity into working memory and initialize its alias count to 1, or locate the working copy of the owning entity and increment its alias count. It will also be appreciated that if the owning entity is a dependent entity, recursive logic may be used to ensure that each entity in the ownership chain of the dependent entity is retrieved into working memory. A handle to the dependent entity is then returned in block 228.

A dependent entity, as its name suggests, cannot exist on its own. This requirement provides the system with one of its main benefits: the ability to segregate and divide the job of memory management across a larger number of discrete program entities. Specifically, instead of having a single memory manager ("garbage collector"), a system incorporating the herein described automated persistence functionality essentially has a large number of dedicated memory managers, since each independent entity serves as the memory manager for its dependent entities. Further, each dependent entity serves as the memory manager for its dependent entities, and so forth. This division of labor greatly reduces the processing cost of managing memory associated with a highly connected graph of entities.

Figure 6:
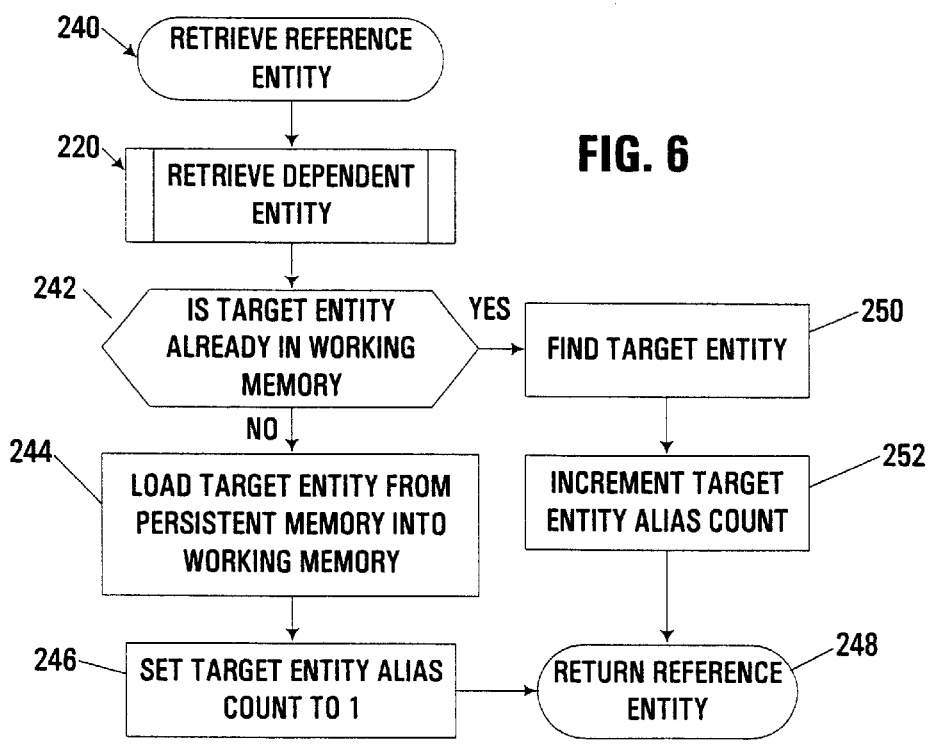
FIG. 6 is a flowchart illustrating the program flow of a retrieve reference entity routine capable of being executed by the entity management system of FIG. 3.

FIG. 6 shows a retrieve reference entity routine 240, representing the logic used when retrieving an existing reference entity or creating a new one. Since reference entities are also dependent entities, the retrieve dependent entity logic represented by routine 220 may be reused here. However, as part of loading the reference entity, routine 240 also ensures that the reference effectively creates a handle to the entity that it references (the "target" entity). Specifically, blocks 242–246 and 250–252 of routine 240 essentially follow the program flow of blocks 202–206 and 210–212 to either load the target entity into working memory and initialize its alias count to 1, or locate the working copy of the target entity and increment its alias count. It will also be appreciated that if the target entity is a dependent entity, recursive logic may be used to ensure that each entity in the ownership chain of the target entity is retrieved into working memory. A handle to the reference entity is then returned in block 248.

FIG. 7 shows a release handle to entity routine 260, representing the logic used when a handle to an entity is released, i.e., more generally when a use of the program entity is discontinued. Routine 260 begins by decrementing the entity alias count in block 262. If the resulting alias count on the entity indicates that no more external aliases to the entity exist (e.g., if the alias count drops to zero, or in some implementations such as where an alias from a local map is also included in the alias count, to 1), block 264 passes control to block 266 to deallocate the entity so that the working memory used by the entity is freed, whereby routine 260 is complete. Otherwise, block 264 bypasses block 266 and terminates the routine without freeing any memory. Note that no other checks are required at this point. Through the unique mechanism described herein it is guaranteed that the entity at issue is not in use anywhere, either directly or indirectly.

FIG. 8 shows a release handle to dependent entity routine 270, which represents the logic used when a handle to a dependent entity is released. Blocks 272–276 of routine 270 function in the same manner as blocks 262–266 of routine 260. Note, however, that when the dependent entity is no longer in use, it invokes the "Release Handle to Entity" logic (represented by routine 260) for its owning entity. This means that, in some cases, releasing a single handle to a dependent entity can result in a large number of entities being removed from working memory, as the entire ownership chain of that entity may no longer be needed.

FIG. 9 shows a release handle to reference entity routine 280, which represents the logic used when a handle to a reference entity is released. Blocks 282–286 of routine 280 function in the same manner as blocks 262–266 of routine 260. Here again, the "Release Handle to Entity" logic (represented by routine 260) is reused, once to release the reference entity's handle on its target entity (block 288), and once to release the reference entity's handle on its owning entity (block 289).

The implementation described here provides important advantages over traditional garbage collection methods. In particular, the cost of automatically freeing memory is reduced to a single comparison test of an alias count member, versus an exhaustive examination of all possible entity connections. In addition, memory can be freed immediately upon its no longer being referenced, while a garbage collection mechanism would by necessity delay reclaiming memory until the garbage collector was either explicitly run (if it is a preemptive garbage collector) or until the garbage collector has coincidentally reached and detected the unreferenced entity.

Furthermore, memory management overhead is significantly reduced since entities are brought into working memory only on an as-needed basis, and since, when an entity is needed, the entity can be brought into working memory without requiring that all of the entities that are referenced by or owned by that entity also be brought into working memory at the same time. Such a configuration minimizes memory requirements by minimizing the creation of working representations to only those entities that are actually in use.

In addition, in the illustrated embodiment, modifications made via the wrapper, or working representation, of an entity, are immediately passed through to the persistent representation of the entity, in effect automatically persisting such modifications. Such functionality relies in part on existing functionality in the DBMS, with the addition of the additional level of indirection from the working representation to the persistent representation. Put another way, modifications made to an entity via a wrapper are applied directly to the persistent representation via the alias thereto in the wrapper. As such, working representations of entities can be released from memory without having to check whether such representations have been modified.

It is also important to note that, not only are the content modifications (e.g., changes to values in existing fields) to entities automatically persisted, but structural modifications are also automatically persisted responsive to structural modifications made working representations of entities. As such, modifications to the structure of a working representation of a program entity, e.g., adding a new parameter (e.g., a new field or an alias to a dependent or target entity) to an entity, removing a parameter from the entity, adding a new entity class (e.g., a new data type or data structure), and/or adding a new entity class domain (e.g., a collection of data types or data structures), may be made dynamically and automatically persisted to the corresponding persistent representation.

Furthermore, in implementations where an object-oriented database underlies the entity management system, such structural modifications are automatically persisted within requiring any modifications to the database schema. In other implementations, e.g., where a relational database underlies the entity management system, such structural modifications may be persisted without requiring any remapping of the relational database or any tables therein. As such, this functionality is particularly useful in an integrated development and runtime environment since entities may be dynamically modified without requiring modifications to the database organization utilized in the underlying database management system.

In other embodiments, however, modifications to a working representation of an entity may not be immediately persisted. In such embodiments, additional logic may be required within the release logic (e.g., within blocks 266, 276 and 286) to check whether an entity is "dirty", and if so to save the entity, prior to releasing the entity from working memory. In addition, such embodiments would require any logic that modifies an entity to "soil" the entity, e.g., by setting a "modified" flag within the entity, or in other manners known in the art.

One manner of implementing the aforementioned routines in entity management system 50 is through the support of a number of interface routines accessible to the higher layers in entity management system 50 (generically referred to as a "client"), as shown in Table I:

TABLE I

| Storage Manager Interfaces | |
|---|---|
| Interface | Description |
| LoadObject | Get a handle to an existing object |
| ReleaseObject | Release an entity's handle to an object |
| GetFeature | Get a handle to a feature from an object |
| CreateObject | Create a new object |
| CreateFeature | Create a new feature |
| SetValue | Set a value for a feature |
| DestroyEntity | Remove an object/feature from both persistent and working storage |

The LoadObject interface receives as input from a client an identifier for a requested object, and generally initiates the following operations:

1. The storage manager determines whether a working representation of the object is already in working storage by attempting to find an entry in a local map that matches the identifier provided by the client. Each entry in the local map includes an object identifier and a pointer to a wrapper in the working storage that functions as the working representation of the object.
2. Based upon the result of this query, the storage manager either creates a new working representation (if no entry is found) or returns a handle to the existing working representation (if an entry is found).
3. First, for the case of no entry being found, the following actions are performed:
    A. The storage manager calls the DBMS to obtain a pointer to the object specified by the input identifier.
    B. The storage manager creates a working representation by instantiating a wrapper, the class definition of which includes, at a minimum, a pointer field containing the pointer returned by the DBMS and a alias count field for storing the number of active aliases to the object.

C. The storage manager adds an entry to the local map including the input identifier and a pointer to the wrapper.

D. In response to the addition of the alias to the wrapper in the local map, the wrapper increments its alias count.

E. The storage manager returns the pointer to the wrapper to the client as the result of the LoadObject operation.

F. In response to returning the pointer for the wrapper to the client, the wrapper increments its alias count, indicating that the client now also holds a handle to the object.

4. Second, for the case of a matching entry being found, the following actions are performed:

A. The storage manager returns to the client the pointer to the wrapper that is stored in the matching entry as the result of the LoadObject operation.

B. In response to returning the pointer for the wrapper to the client, the wrapper increments its alias count, indicating that the client now also holds a handle to the object.

The ReleaseObject interface is called in response to a client desiring to release its handle to an object, and generally initiates the following operations:

1. In response to the client releasing its handle, the wrapper automatically decrements its alias count.

2. If the alias count remains above one, no further actions are taken. However, if the alias count falls to one (indicating that the only alias to the wrapper is in the local map for the storage manager), the wrapper notifies the storage manager that the wrapper is no longer in use.

3. Once notified that the wrapper is no longer in use, the storage manager releases its handle to the wrapper by removing the associated entry from the local map.

4. Once the handle is released by the storage manager, the wrapper decrements its alias count to zero, which causes the wrapper to thereafter to destroy itself and free the memory allocated thereto.

The GetFeature interface receives as input from a client a requested feature from a target object, and generally initiates the following operations:

1. The wrapper for the target object (referred to here as an owning wrapper) determines whether a working representation of the requested feature has been created, by searching the local map for an entry corresponding to the requested feature.

2. If the working representation has not been created, the following actions occur:

A. The wrapper calls the DBMS to obtain a pointer to the requested feature.

B. The storage manager creates a working representation by instantiating a wrapper for the feature, the class definition of which includes, at a minimum, a pointer field containing the pointer returned by the DBMS, an alias count field for storing the number of active aliases to the object, and an owner field for storing a pointer to the owning wrapper.

C. The feature wrapper stores the pointer to the owning wrapper in its owner field.

D. The owning wrapper increments its alias count as a result of the feature wrapper's alias thereto.

E. The storage manager adds an entry to the local map including a "key" providing an identifier for (e.g., a pointer to) the persistent representation of the feature and a "value" of (e.g., a pointer to) the feature wrapper.

F. In response to the addition of the alias to the feature wrapper in the local map, the wrapper increments its alias count.

G. The owning wrapper returns the pointer to the feature wrapper to the client as the result of the GetFeature operation.

H. In response to returning the pointer for the feature wrapper to the client, the feature wrapper increments its alias count, indicating that the client now also holds a handle to the feature.

3. If the working representation has already been created, the following actions occur:

A. The owning feature returns to the client the pointer to the feature wrapper that is stored in the matching entry as the result of the GetFeature operation.

B. In response to returning the pointer for the feature wrapper to the client, the feature wrapper increments its alias count, indicating that the client now also holds a handle to the feature.

The CreateObject interface generally initiates the following operations:

1. The storage manager generates a unique identifier for the object.

2. The storage manager calls the DBMS to instantiate an object based on the minimal object entity classification to generate a persistent representation of the object. In response, the DBMS creates the persistent representation of the object according to the database schema, storing the unique identifier supplied by the storage manager. The DBMS then returns a pointer to the newly created object to the storage manager.

3. The storage manager creates a working representation of the object by instantiating a wrapper in working storage, following the general sequence of operations discussed in steps 3B-3F of the LoadObject interface discussed above. As a result of the operation, a pointer to the working representation of the object is returned to the client.

The CreateFeature interface generally receives a pointer to an owning entity (object or feature) as well as feature type information, and initiates the following operations:

1. The storage manager calls the DBMS to instantiate a feature based on the minimal feature entity classification corresponding to the requested feature type to generate a persistent representation of the feature. In response, the DBMS creates the persistent representation of the feature according to the database schema, storing in the owner field a pointer to the owning entity supplied by the storage manager. The DBMS then returns a pointer to the newly created feature to the storage manager.

3. The storage manager creates a working representation of the feature by instantiating a feature wrapper in working storage, following the general sequence of operations discussed in steps 2B-2H of the GetFeature interface discussed above. As a result of the operation, a pointer to the working representation of the feature is returned to the client.

The SetValue interface generally receives from a client a new value directed to the specific feature to be modified. The storage manager handles such a request by forwarding the request to the DBMS, such that the new value is stored in the persistent representation of the feature. By virtue of the use of a wrapper that points to the persistent representation, but does not actually store any values separate therefrom, modifications to the contents of features are automatically persisted to the persistent representations responsive to such modifications.

The DestroyEntity interface permits entities (objects and/or features) to be destroyed in a recursive manner. In response to DestroyEntity request, the following operations are performed:

1. The entity calls the DBMS to get pointers to all features that are aliased by the entity.
2. For each aliased feature, a DestroyEntity request is passed to the aliased feature.
3. Once all aliased features have been destroyed, the entity calls the DBMS to destroy the persistent representation thereof.
4. The entity marks itself as "invalid".

In some implementations, the entity could free itself from memory once the persistent representation is destroyed. However, in the illustrated implementation, this is not performed so that a wrapper can remain in memory until all outstanding aliases to it are released.

It should be noted that the working representation of a program entity in the illustrated embodiment essentially is an interface to the actual data stored in the persistent representation of the program entity. Modifications to a working representation, which can include modifications to the contents of an entity (e.g., to change the value in a feature) as well as modifications to the structure of an entity (e.g., to add or remove a feature from an object), are therefore simply passed through to the persistent representation. In other implementations, however, it may be desirable to copy all or a portion of the contents of a persistent representation of a program entity into a working representation, and thus perform modifications to the working representation as well. However, by maintaining the actual contents of a program entity in a single representation (i.e., the persistent representation), the overall size occupied by a working representation is minimized.

In addition, using known caching facilities provided in an underlying DBMS, the actual data within the persistent representation may be cached in working memory as a matter of course to improve performance. Also, in some implementations it may be desirable to cache some additional information regarding an entity separate from the DBMS, e.g., to cache the ID for an object and/or a value for an attribute, to further improve performance.

Figure 10G:
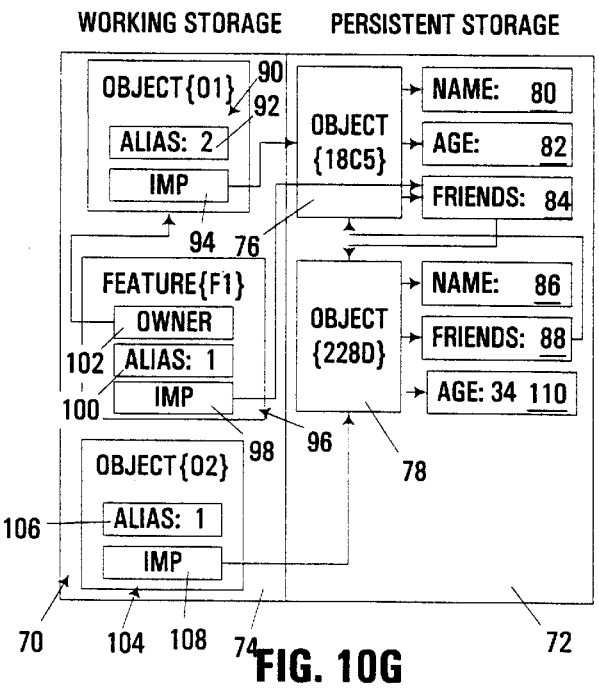

To further illustrate the above-described functionality, FIGS. 10A–10G illustrate the manipulation of a plurality of program entities in an exemplary programming environment 70, including persistent storage 72 and working storage 74. As shown in FIG. 10A, persistent representations of a pair of exemplary program entities, objects 76 and 78 are shown stored in persistent storage 72. Object 76 owns three feature program entities, a name feature 80, an age feature 82 and a friends feature 84, persistent representations of which are also stored in persistent storage 72. Likewise, a name feature 86 and a friends feature 88 are owned by object 78, persistent representations of which are also stored in persistent storage 72. Objects 76, 78 are related to one another through cross-aliases stored in friend features 84, 88.

FIG. 10B illustrates the result of a LoadObject operation performed on object 76. Given no working representation is currently in storage 74, as a result of this operation, a working representation 90 of object 76 is created in working storage 74. Working representation 90 is a wrapper, including an alias to the persistent representation, stored in an implementation ("IMP") field 92. Representation 90 also includes an alias count field 94, storing the number of aliases to the object (here, one alias by virtue of the new attempt to get a handle to the object). It will be appreciated that additional attempts to access the object will not create a new working representation. Instead, the alias count is increased and an alias to the existing working representation is returned.

FIG. 10C illustrates the result of a GetFeature operation performed on object 76, to get a handle to the friends feature 84 of object 76. Given no working representation is currently in storage 74, as a result of this operation, a working representation 96 of feature 84 is created in working storage 74. Working representation 96 is a feature wrapper, including an alias to the persistent representation (stored in IMP field 98), an alias count field 100, storing the number of aliases to the feature, and an owner field 102, storing an alias to the wrapper for the owner to the feature (here, working representation 90). As an additional aspect of this operation, the addition of an alias in owner field 102 increments the alias count for object 76.

FIG. 10D illustrates the result of a LoadObjectFromFeature operation performed to access the first aliased object stored in feature 84 of object 76. As a result of this operation, a working representation 104 of object 78 is created in working storage 74, including an alias count of one stored in field 106 and an alias to object 78 stored in field 108.

It should be noted that, by maintaining separate working and persistent representations of program entities, a potentially infinite object model may be maintained within a finite memory space. As an example, with objects 76, 78, successive calls to retrieve the "friend" of each object could be made ad infinitum.

FIG. 10E next illustrates the result of a CreateFeature operation performed to add an "age" feature 110 to object 78. A default value (typically taken from a feature definition associated with the feature), is initially stored in feature 110. However, no working representation of the feature is created in working storage, as no handle to the feature is returned as a result of the operation.

FIG. 10F illustrates the result of a GetFeature operation performed on object 78, followed by a SetValue operation performed on the feature for which a handle is obtained. The GetFeature operation results in the creation of a working representation 112 of feature 110, including an alias count of one in field 114, an alias to feature 110 in IMP field 116 and an alias to working representation 104 of object 78 in owner field 118. Once the handle is obtained, the SetValue operation then updates the persistent representation of field 110 to the desired value.

FIG. 10G illustrates the result of a release of a handle to feature 110, e.g., as a result of a ReleaseObject operation. Assuming the alias count stored in field 114 of working representation 112 is one prior to the operation, the release results in the working representation 112 being freed from working storage 74. Also, the alias count of the owning object working representation 104 is decremented.

Through the use of dynamic memory management in the manner discussed herein, program entities may be automatically persisted in a timely and reliable fashion. Often, application reliability and development speed are improved due to the increased reliability, reduced risk of losing changes, and the reduced need for developer-initiated persist operations.

Database Organization

Based upon the above-described memory management scheme discussed above, program entities may be populated in database 44, 46 by entity management system 50. The format of such program entities are generally defined in meta model layer 54, with the memory management thereof managed by storage layer 52 in the manner discussed above.

Figure 11:
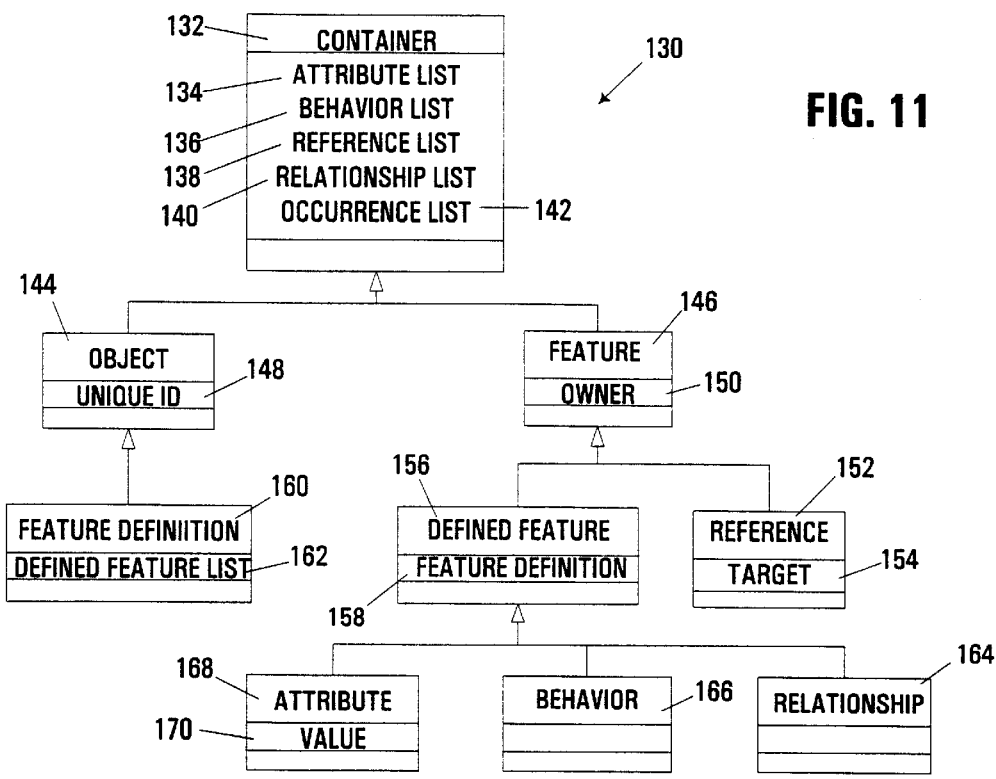
FIG. 11 is a class diagram of the primitive entity classifications utilized in the entity management system of FIG. 3.

FIG. 11 illustrates an exemplary class diagram 130 representing the basic entity classifications used to define at meta model layer 54 all program entities stored in integrated development and runtime environment 42. An entity classification is analogous in many respects to a class in an object-oriented environment.

All entities in environment 42 are based on a container entity classification 132, which incorporates at a minimum a plurality of lists 134–142, each of which potentially contains one or more aliases to various types of feature entities that are aliased by a container, and thus serve to "describe" the container. An attribute list 134, for example, provides a list of attributes describing the container. Behavior list 136, reference list 138 and relationship list 140 likewise provide lists of behaviors, references and relationships describing the container. Occurrence list 142 (which is optional), serves a slightly different purpose—that of providing aliases to all references that alias the container, i.e., those references for which the container is a target. This form of "back link" assists in navigation through entities stored in the database.

Two types of entity classifications, an object entity classification 144 and a feature entity classification 146, extend the basic container entity classification 132. Object entity classification 144 represents the minimal stand-alone entity—i.e., an entity that is not "owned" by any other entity in the database. Classification 144 adds a unique ID field 148, thereby providing an identifier with which each stand-alone entity in the database can be located.

Feature entity classification 146 represents the minimal feature entity, which is required to be "owned" by another entity in the database. As such, classification 146 adds an owner field 150, which provides an alias to the entity (whether an object or feature) that owns the feature entity. As discussed above, ownership of one entity by another entity dictates that the owned entity is automatically terminated (i.e., destroyed or otherwise released from memory) responsive to termination of the entity that owns such owned entity.

Feature entities are further defined as being undefined or defined. In the illustrated embodiment, only one undefined feature is supported, represented by a reference entity classification 152. The reference entity classification adds a target field 154, which provides an alias to the target of the reference.

Defined features are represented by defined feature entity classification 156, which adds a feature definition field 158 to the feature entity classification. Field 158 includes a pointer to a feature definition entity, which serves to provide a "kind" or "type" for a feature. A feature definition entity, or simply a "definition entity", is based on a feature definition entity classification 160, which extends object entity classification 144 to provide a defined features list 162 that includes pointers to each feature entity defined by the feature definition. Given that a feature definition is a type of object entity, the feature definition is stand-alone, and includes a unique identifier. A benefit of such an arrangement is that certain features may be referenced programmatically through their feature definitions, such that the identity of the owning entity for a particular feature is not required to access the feature.

Defined feature entities are further defined as either relationships, behaviors or attributes, represented by relationship entity classification 164, behavior entity classification 166 and attribute entity classification 168. Relationships are principally used to hold a set of aliases to reference entities that reference other entities that are related in some fashion to one another (e.g., friends, To Do items, clients, etc.). Behaviors are principally used to hold one or more actions capable of being performed by an owning entity, typically through a reference or function call to a specific routine, and/or though incorporation of the actual program code for the routine. Attributes are principally used to hold values (e.g., a represented by value field 170 added to the defined feature entity classification by attribute entity classification 168).

In some implementations, it may be desirable to permit other entities to store values, particularly other feature entities. Also, in some instances, attribute, behavior, relationship and/or reference features may be based on the same entity classifications, so long as such features remain owned by another entity and capable of owning another entity. However, by enforcement of value storage in attributes, and the maintenance of separate classifications for attributes, behaviors, relationships and references, it is believed that the resulting computer language defined by the entity classifications provides relatively greater intuitiveness, while maintaining comparable expressiveness.

Figure 12:
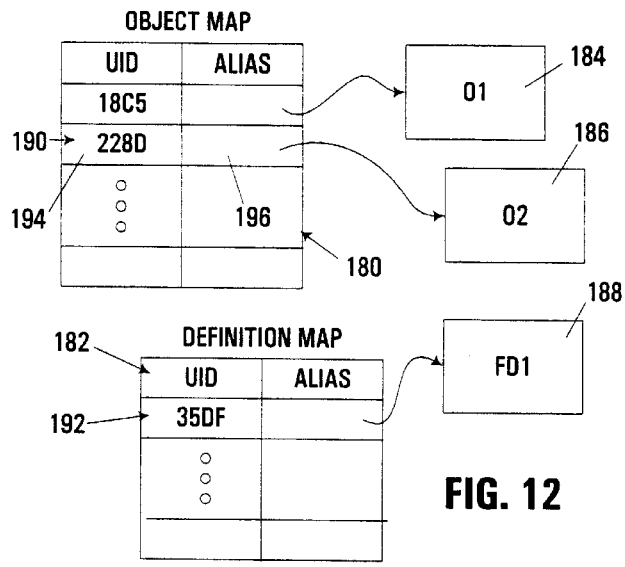
FIG. 12 is a block diagram of an object map and definition map utilized in locating program entities in the entity management system of FIG. 3.

To permit each entity in the database to ultimately be capable of being located, the unique identifier for each stand-alone entity (object or feature definition) is maintained in a map or table that couples each unique identifier with a pointer to the entity identified by such identifier. For example, as shown in FIG. 12, it may be desirable to maintain separate object and feature definition maps 180, 182, each including a plurality of entries 190, 192 for respectively storing in an ID column (e.g., column 194 for map 180) the unique identifiers for all of the object and feature definition entities stored in the database (e.g., entities 184, 186, and 188), with aliases to the actual object and feature definition entities mapped to each unique identifier (e.g., as represented by column 196 of map 180).

All entities created in environment 42 are based upon one of object entity classification 144, feature definition entity classification 160, reference entity classification 152, relationship entity classification 164, behavior entity classification 166 and attribute entity classification 168, such that each of these classifications form the basic semantic entity classifications for the "computer language" implemented in environment 42. The remaining classifications are simply base classifications that assist in implementing the basic entity classifications in an object-oriented environment such as c++, although no entities are actually instantiated from such intermediate entity classifications.

Definition Entities

As discussed above, definitions form an important component of the herein-described entity management system, essentially serving as a kind of "template" or even "parent" entity for fields that appear in a database. Every dependent entity, e.g., every defined feature such as an attribute, behavior or relationship, is associated with a feature definition. While conventional relational databases have to an extent recognized the benefit of identifying unique features (e.g., individual columns in a relational database), the herein-described entity management system is unique in that it "objectizes" this concept to make it a fully formed object in its own right.

As a further example of the use of definition entities, FIG. 54 illustrates a pair of distinct entities 800, 802, each with its own structure. Each entity 800, 802 has an address field 804, 806, but that field appears in a different physical location in each entity. By associating fields 804, 806 with a definition entity 808 (which has a unique identity, permitting the definition to be referred to and retrieved via a unique ID 810), it is possible for the system to support logical operations like "Find all entities whose Address Field contains 'Cincinnati'", even in situations where the list of entities being searched is heterogenous and some or all of the entities were defined by the end user.

Another important aspect of a definition entity is its existence as a separate entity in the system. A definition can also contain fields, can define default values for all newly created fields based on it, and can define a complex structure that can be shared by all of its defined fields. This makes it possible for a system to support constraints on fields (e.g., to limit the value of a field to a certain range, limit the contents of a relationship to only entities of a certain type, etc.).

FIG. 55, for example, shows a locate field routine 820 that shows the logic used when the entity management system looks for a particular field on an entity (here the aforementioned "address" field). Because the system is dynamic and flexible, the position of a field inside an entity may not be known, so the system must locate it by the unique ID of its associated definition. Routine 820 begins in block 822 by getting the unique ID of the definition (here, the address definition) that describes the field to be located. Next, block 824 initiates a FOR loop to process each field in the entity. For each such field, block 826 attempts to determine if the unique ID of the field's definition matches that of the definition being searched. If so, control passes to block 828 to return the located field and terminate the routine. If not, however, control passes to block 830 to get the next field in the entity, and then to block 826 to analyze the next field. If all fields are processed without a match, block 830 passes control to block 832 to return a NULL value and terminate the routine.

FIG. 56 illustrates a create field routine 840 showing the logic used when creating a new field (e.g., an attribute or relationship). Routine 840 begins in block 842 by adding the field to the entity, using logic described elsewhere herein. In addition, as shown by block 844, a field is required to be associated with a definition in order to exist in the system, and this association is established at the moment when the field is added to an entity, and prior to completion of routine 840. If no definition is supplied, a default definition may be used. Moreover, in general, duplicate fields are not allowed.

Using the basic building blocks of the herein-described object organization (definitions, attributes, and relationships), higher-level capabilities may be overlayed onto the basic database organization, such as object inheritance; selective inheritance; bi-directional relationships; containment relationships (i.e., so that when an owning entity is destroyed, all entities in the containment relationship are also destroyed, and when an owning entity is copied, all entities in the containment relationship are also copied); type constraints (i.e., so that an entity or relationship can only contain other entities of a particular type, e.g., with a specified parent, grandparent, etc.); cardinality constraints (i.e., so that an entity or relationship can contain at most X entities, and/or cannot contain less than Y entities); create-in associations (i.e., so that whenever a new child of an entity is created, the child is automatically added to one or more target locations, e.g., a new Company instance will always be added to an "All Companies" folder); constrained and multi-value attributes (i.e., to support radio buttons or drop-down list boxes where an attribute must hold a value from a pre-defined set of values or an attribute can hold multiple values from a pre-defined set of values.

As an example of the latter attributes, consider a font selection dialog, which may include drop-down lists for font size, font face, etc. Such a control might be supported through multi-value attributes that have two relationships on them: one relationship that holds a list of "allowed choice" objects; and another relationship that holds a list of the "current choice" objects.

As another example, FIG. 57 shows an example of how the herein-described object organization can be used to support "type constraints"—that is, to restrict the type of entity that can be referenced from another entity. In this example, a "contacts" entity 900 is "constrained" to hold only "person" entities by virtue of a "constraining types" relationship definition entity 902. Any time an entity has a relationship of this type attached to it, and that relationship is not empty, the entity management system uses the entities in that relationship as an "allowed set" and limits what can be added to the owning entity.

FIG. 58 illustrates an exemplary add item routine 910 that shows the logic used to enforce type constraints, here to add a destination entity to a relationship. It is to be noted that this functionality is not directly implemented within the herein-described object organization, this functionality is implemented at a relatively higher layer in the entity management system (in particular, the meta model layer), and shows how the flexibility of the underlying generic organization or schema permits various widely used, and useful, higher-level capabilities, to be implemented.

Routine 910 begins in block 912 by determining whether the destination for the defined relationship has a constraining type defined by the relationship definition for that relationship. If not, control passes to block 914, where the item is added as a destination for that relationship, and routine 910 terminates. If, however, a constraining type is defined, block 912 passes control to block 916 to get all items from the constraining type definition. Block 918 then determines whether the item being added is a child of one or more of the constraining types in the definition. If so, control passes to block 914 to add the item. If not, however, an "invalid type" indication is returned and routine 910 terminates without adding the item.

FIG. 59 shows another example of a higher-level functionality, this time of a "choice attribute," which is an attribute that takes its value from a set of pre-defined allowed choices. In this implementation, a choice attribute entity 930 has two relationships 932, 934 attached to it. The items held by the first relationship 932 define the set of allowed choices or values for the attribute. The item (or items) held by the second relationship 934 define the current selected choices or values for the attribute. In this example, the attribute is a font face, with the first and second relationships associating the font face with a number of possible font face values.

FIG. 60 illustrates a get attribute value routine 940 that shows the logic that may be used to retrieve the value of an attribute. Routine 940 begins in block 942 by determining whether the attribute is a choice attribute or not. If not, control passes to block 948 to retrieve the value "normally" by looking directly in the attribute. But if it is, control passes to block 944 to retrieve all of the items in the current choice relationship on the attribute, and then to block 946 to return the value fields from those items as the value of the attribute.

It should be noted that an important aspect of the herein-described object organization is the philosophy that "every field is an entity." As an example, in supporting choice attributes, two relationships have been attached to the attribute. Further, these relationships, in turn, could be constrained, e.g., the current choice relationship may have a maximum cardinality of one, indicating a single-choice attribute. Because the maximum cardinality field would be implemented as an attribute, an attribute entity would need to be placed on the relationship. Further, if the maximum cardinality attribute was defined as a choice attribute, then that attribute would need to contain two relationships, one of which would have an attribute which would contain two relationships, and so forth.

As such, it may be seen that practically any higher-level functionality of an object-oriented environment may be implemented directly on top of the herein-described object organization. Moreover, given the flexible, dynamic and powerful abilities of the entity management system described herein, such functionalities can often be implemented without requiring any modification to the underlying organization, and in particular without requiring any database schema modification or program code recompilation.

Database Seeding

Another important aspect of the illustrated entity management system is the concept of database seeding. While some implementations may require no database seeding, and may rely on the aforementioned object classifications, the illustrated embodiment relies on some degree of seeding of basic entities to support a number of the types of unique functionality discussed herein, e.g., object inheritance (including implicit inheritance and selective inheritance), and bidirectional relationships (discussed below), among others. For each of these functionalities, feature definition entities may need to be created and placed in the database, including, for example, a "parent" relationship, a "should inherit" attribute, a "back link" relationship, etc. By supporting such functionalities in populated entities, rather than in the core schema, the core schema is kept as simple and lean as possible. However, in other implementations, such functions may be implemented directly within the core schema itself, rather than in any populated entities. Moreover, other functionalities described herein as being implemented within the core schema may be implemented in higher-level populated entities in some implementations.

FIG. 61, for example, shows how database seeding may be relied upon to support dynamic, user-definable object inheritance. The core schema described herein in not configured to include at its most basic level the concept of object inheritance. In the illustrated implementation, this concept is introduced by creating a parent definition entity 850 in the database, used to define the characteristics of a parent relationship 854 between any parent and child entity (e.g., parent entity 856 and child entity 858). This parent definition entity is typically referred to as a system definition, to distinguish it from user-created definitions.

Like other system definitions, the unique ID 852 of the parent definition entity 850 is known to entity management system 50, and this definition is used to create and maintain the parent-child relationships between entities. The entity management system defines and uses other key objects and definitions, such as the gene attribute (used for selective inheritance), the name attribute (a very common field used on almost all entities), the backlink relationship (used for bi-directional relationships), and so forth. These other definitions are described in greater detail in other sections of the instant disclosure.

Implicit Inheritance

Another feature that may be implemented in an entity management system consistent with the invention is that of "implicit" inheritance, whereby inherited fields and field values (or parameters and parameter values) are duplicated in working memory when a child entity is loaded from persistent storage and are not duplicated in the persistent storage itself. Thus, in addition to inheriting all or part of the structure of a parent entity, a child entity can also inherit all or part of the content, or data, stored in the parent entity. Doing so can significantly reduce the amount of duplicate information stored in a database and while still reducing the cost of changing the structure of entities stored in a populated database or distributed collection of databases.

In addition, an entity management system consistent with the invention may also support the ability for a child to gain its own copy of an inherited field, e.g., in response to an operation that sets the child's field to a unique value. In this situation, the child is said to "override" the inherited field value. Consistent with this invention, when an inherited but not-owned field is modified, a new field may be added to the database for that child, with the child gaining an "override" for that inherited field. Once a child entity overrides a field, changes to the parent entity's field will have no effect on the child's field.

To implement inherited features, generally an ordered traversal through an ownership chain of a child entity is performed in response to a request for a field from a database to determine which entity owns the field. First, the child entity itself is queried to determine if the field is owned by that entity. Otherwise, the ownership chain is traversed until an owning parent entity is found, and a copy of the field in that owning entity is returned as a result of the request as if the field were directly owned by the child entity. As such, the in-memory copy of an inherited field may be considered to be a "virtual" or "implicit" field because it only appears to exist in the persistent storage of the database.

To minimize the performance impact of changes to the structure and/or contents of parent entities, whenever a new field is added to a parent entity, or the value of an existing field is changed on a parent entity, child entities that are not in use (e.g., in working memory) are not immediately affected. This is implemented by ensuring that child entities gain inherited fields when they are loaded into working memory. The result is that the time and expense of changing the structure of widely used entities in a fully-populated database may be greatly reduced, since making any change does not require physically traversing to all children, grandchildren, etc. of a parent, nor does it require loading all descendants of the parent into working memory. Furthermore, the amount of redundant data stored in a database may be greatly reduced. Also, by reducing redundant data, the chance of "missing" duplicated data is reduced during an update of a database, which in turn can reduce the number of database errors, incorrect values, or out-of-sync entities.

In the illustrated embodiment, implicit inheritance is implemented within the object model layer 56 of entity management system 50 (FIG. 3), although such functionality may be implemented at other layers consistent with the invention. Furthermore, in the illustrated implementation, event notification is utilized to keep child entities that are in the volatile memory synchronized with their parent entities. Event notification is a well-understood mechanism within the art, and a number of conventional designs for event notification components may be used to fulfill this role. For example, in the illustrated embodiment, a publish-subscribe event notification mechanism is utilized, the use and configuration of which is generally understood in the art.

In general, implicit inheritance is managed by a software interface in object model layer 56 that creates in-memory representations of fields that are inherited but not overridden ("implicit" fields). This interface also automatically detects when such a field is modified, and creates a field on the child entity to hold the overriding information. In addition, when a new field is added to a parent entity, or the value of a parent field is changed, the interface ensures (by sending an "event notification") that all children currently in memory are updated to reflect the change.

Figure 13:
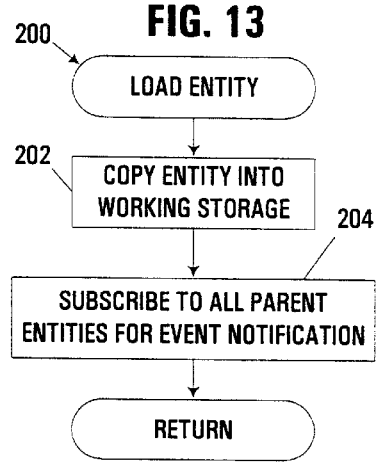
FIG. 13 is a flowchart illustrating the program flow of a load entity routine capable of being executed by the entity management system of FIG. 3.

As shown in FIG. 13, for example, an object model layer load entity routine 200 is called in response to a request to access a particular entity in entity management system 50. In response to such a request, block 202 copies the requested entity into working storage, i.e., creates a working representation of the entity, which typically takes the form of a wrapper that aliases, or points, to the persistent representation of the entity in persistent storage. It is typically through the working representation of the entity that future accesses to the entity are processed.

Next, block 204 subscribes the entity (in particular, the working representation thereof) to receive event notifications from all parent entities to the entity. In a single inheritance object model, only one parent entity would exist. In a multiple inheritance object model, however, more than one parent entity may exist.

Upon completion of block 204, routine 200 is complete. Typically, a handle to the created working representation of the entity is returned as a result of the routine.

Figure 14:
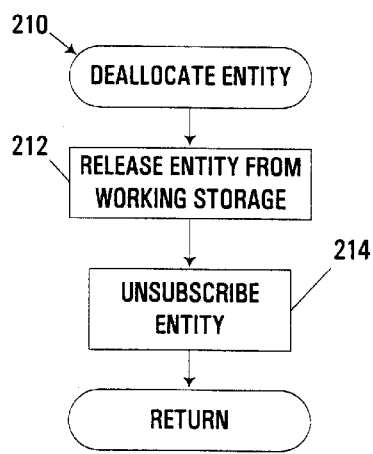
FIG. 14 is a flowchart illustrating the program flow of a deallocate entity routine capable of being executed by the entity management system of FIG. 3.

FIG. 14 next illustrates a deallocate entity routine 210 that is called whenever an entity needs to be deallocated, e.g., whenever the working representation of the entity is no longer in use. Routine 210 begins in block 212 by releasing the working representation of the entity from working storage. Next, block 214 unsubscribes the entity from event notifications from its parent(s). Routine 210 is then complete.

As a result of the subscription and unsubscription of an entity based upon the creation and deletion of a working representation of the entity, it may be seen that only entities that are currently in use (i.e., have existing working representations) will be notified whenever a parent entity sends a notification. Thus, in response to a modification to a parent entity, only those child entities that are currently in use will be immediately updated responsive to such modification. For all other child entities, no updates will occur immediately. Rather, such non-used child entities will be dynamically constructed when they are later used based upon the modified parent entity in existence at that time.

Figure 15:
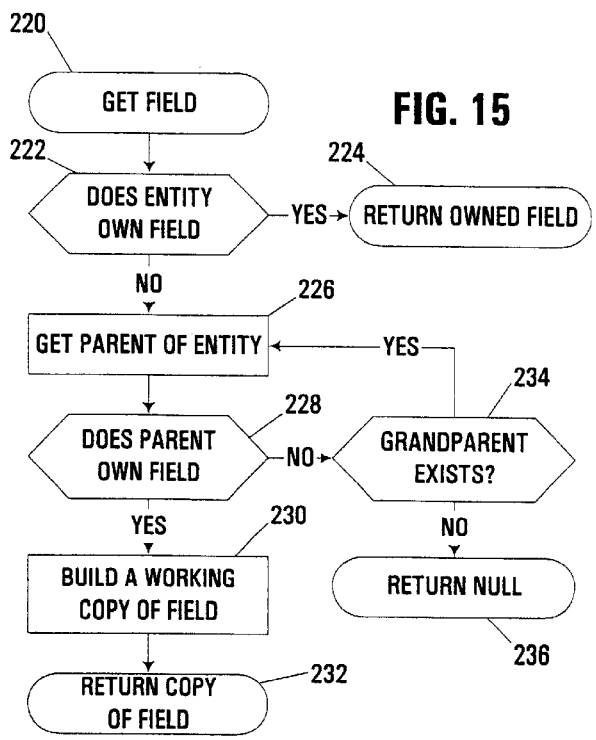
FIG. 15 is a flowchart illustrating the program flow of a get field routine capable of being executed by the entity management system of FIG. 3.

FIG. 15 next illustrates a get field routine 220 that is called in response to a request to use a field in a particular entity. In this implementation, the term field is considered to be one example of a parameter that defines some characteristic of a particular entity. In entity management system 50 discussed herein, where fields or parameters for an entity are typically implemented using separate entities that are aliased by that entity, a field may comprise an alias or pointer to another entity. In other implementations, however, a field or parameter may represent a storage location or variable directly implemented within an entity.

Routine 220 begins in block 222 by determining whether the entity owns the requested field—that is, whether a persistent representation of the field is associated with (e.g., logically arranged within) the persistent representation of the entity. If so, control passes to block 224 to return a handle to the owned field as the result of the get field request, whereby routine 220 is complete.

If not, however, block 222 passes control to block 226 to get the parent entity to the current entity, typically by traversing an alias to the parent entity. Next, block 228 determines whether that parent entity owns the requested field. Put another way, block 228 determines whether the requested field is implicitly inherited from the parent entity.

If so, control passes to block 230 to build a working copy or representation of the requested field in the working storage. The working representation of the requested field is accessible via the working representation of the entity upon which the get field request was made, e.g., by being logically arranged within the working representation of such entity, or being otherwise aliased or linked to such working representation. Moreover, the working representation of the requested field is associated with the original, persistent representation of the requested field in the parent entity that owns the requested field, e.g., via an alias to the persistent representation of the parameter in the owning parent entity.

Once a working representation of the requested field has been created, a handle to the working representation is returned in block 232, and routine 20 is complete.

Returning to block 228, if the current parent entity does not own the requested field, control passes to block 234 to determine whether a grandparent entity (i.e., a parent entity to the current parent entity) exists. If so, control returns to block 226 to get such grandparent entity and determine whether such grandparent entity owns the requested field. As such, the ownership chain of the original entity is traversed sequentially until the owning entity of the requested field has been found. If no such entity is found, block 234 passes control to block 236 to return a "null" handle and terminate routine 220. In applications where multiple inheritance is supported, it should be appreciated that multiple paths may be defined in an ownership chain, such that routine 220 would need to be configured to traverse all such paths to locate the appropriate owning entity.

Figure 16:
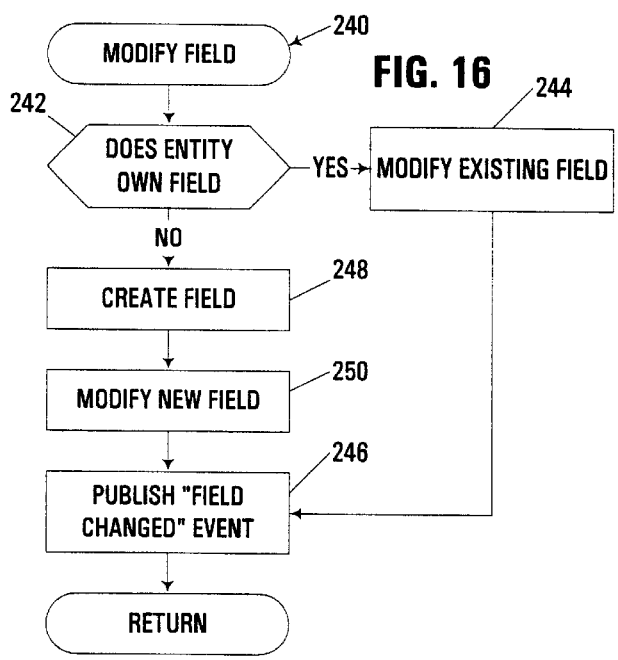
FIG. 16 is a flowchart illustrating the program flow of a modify field routine capable of being executed by the entity management system of FIG. 3.

As discussed above, the aforementioned subscription notification mechanism ensures that modifications to a field or parameter in an entity will be propagated to other entities for which working representations thereof exist in the working storage. FIG. 16, for example, illustrates the operation of a modify field routine 240, called in response to a request to modify the contents, e.g., a stored value, associated with a particular field. The modify field request presumes a handle has been obtained for the requested field (e.g., via a get field request), so that a working copy of the requested field exists in the working storage.

Routine 240 begins in block 242 by determining whether the entity owns the field, i.e., whether the field is or is not implicitly inherited from another entity—typically by determining if the working copy of the field includes an alias to the persistent representation of the entity. If the entity owns the field, control passes to block 244 to modify the existing field, e.g., by traversing the alias in the working copy of the field to the persistent copy of the field for the entity, and modifying the contents of such persistent copy.

Next, block 246 publishes a "field changed" event to the child entities that have subscribed to the current entity. Given that such subscriptions are registered only when a working representation of a child entity has been created, it may therefore be seen that only child entities that are currently in use are immediately notified of the modified field. Routine 240 is then complete.

Returning to block 242, if the entity does not own the field, control passes to block 248 to "override" the implicitly inherited field and convert such field to a local, owned field for the entity. Specifically, block 248 creates a new persistent representation of the field in the persistent representation of the entity. In addition, it may be desirable to update the alias in the working representation of the field to alias the new field in the entity. In the alternative, a new working representation of the field may also be created, so that the original field can be maintained in working storage if other entities contain handles to the original field.

Next, block 250 modifies the persistent representation of the new field to include the overriding data. Control then passes to block 246 to publish a "field changed" to any subscribed child entities. Routine 240 is then complete.

Figure 17:
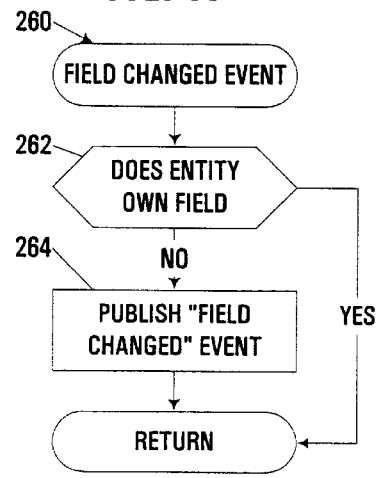
FIG. 17 is a flowchart illustrating the program flow of a field changed event handler routine capable of being executed by the entity management system of FIG. 3.

FIG. 17 illustrates a field changed event handling routine 260 that is called in response to receipt of a "field changed" event received by a subscribed entity. Routine 260 begins in block 262 by determining whether the entity receiving the notification owns the specified field—that is, whether the field has been overridden in the local entity. If so, routine 260 terminates. If not, however, the children of the local node are notified of the field change by publishing another "field changed" event to all of the in-use children of the local node, and routine 260 then terminates. As such, it may be seen that the field modification is propagated to all children that implicitly inherit a modified field. However, since retrieving the contents of a field still operate directly on the owning entity of a field, the actual modification to the contents of the field are not actually propagated via the event notification mechanism.

Figure 18:
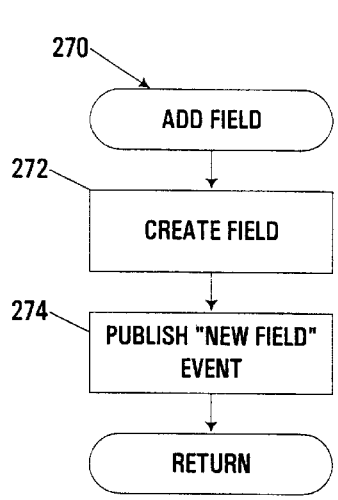
FIG. 18 is a flowchart illustrating the program flow of a add field routine capable of being executed by the entity management system of FIG. 3.

FIG. 18 illustrates an add field routine 270, which is called in response to a request to add a field to a particular entity. Routine 270 begins in block 272 by creating the field, i.e., by creating a persistent representation of the field in the persistent representation of the entity. Next, block 274 publishes a "new field" event to the children of the entity, and routine 270 terminates. As will become more apparent below, publication of the "new field" event results in each in-use child entity immediately being updated with a new implicitly inherited field.

Figure 19:
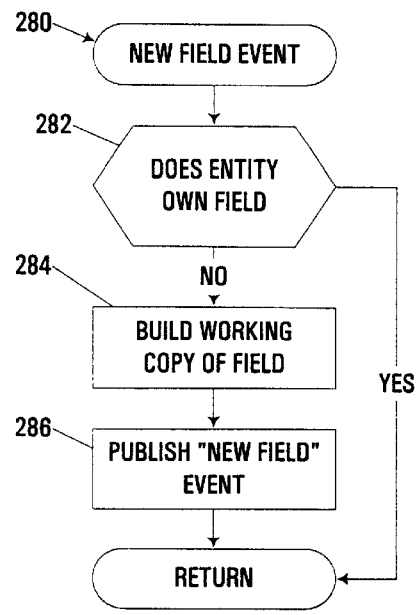
FIG. 19 is a flowchart illustrating the program flow of a new field event handler routine capable of being executed by the entity management system of FIG. 3.

Specifically, FIG. 19 illustrates a new field event handling routine 280 that is called in response to a "new field" event received by an entity. Routine 280 first begins in block 280 by determining whether the entity owns the field being added—that is, whether the entity has overridden the parent entity with regard to this field. If so, routine 280 terminates. However, if the entity does not own the field, control passes to block 284 to build a working copy of the field in the working storage, with such working copy permitting access to the persistent representation of the field for the owning parent entity. Block 286 then publishes a "new field" event to each of the in-use children of the entity, such that the new field is propagated to all in-use descendants of the entity that added the new field. Routine 280 is then complete.

In some implementations, it may also be desirable to permit application code or entities to also receive "new field" or "field changed" events, e.g., so that any views displayed to a user are updated to immediately reflect changes made to entities.

It should be noted that typically most child entities will not be in memory when a "new field" or "field changed" event is published. Any children not in working memory (not in-use) are not affected by this operation. However, whenever such unused children are next loaded into memory, if the new field is requested from any such child, the logic of get field routine 220 will be invoked, and an implicit copy of the parent's feature will be returned.

Implementing such functionality permits, for example, a parent entity's structure to be changed while an application is running, yet permitting the change to be made efficiently, even though the parent entity may have hundreds, thousands, or even millions of child entities in existence, most of which are not currently "in-use." Nonetheless, the next time any child entity is put into use, it will automatically reflect the new shared structure. In this situation, upgrade utilities may not be needed, nor will an environment need to be shut down and restarted, and the change will typically take effect in seconds, rather than in minutes, hours, or even days as might be required for a very large system.

Figure 20A:
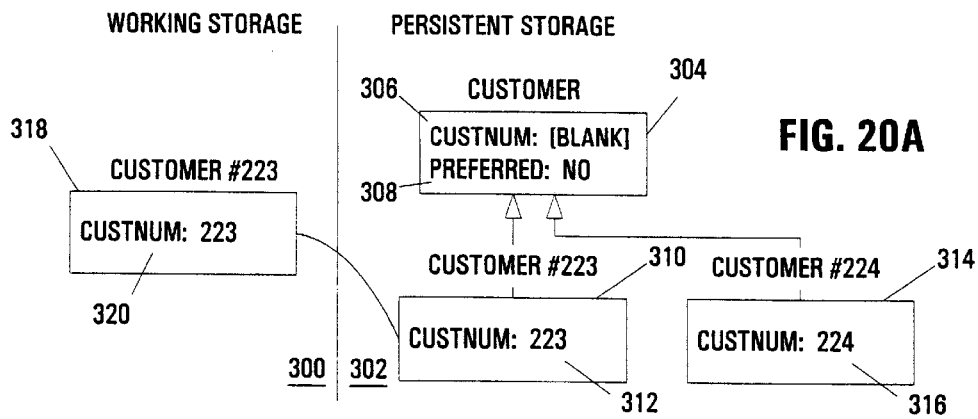
FIGS. 20A–20C are block diagrams illustrating the concept of implicit inheritance using the entity management system of FIG. 3.
Figure 20B:
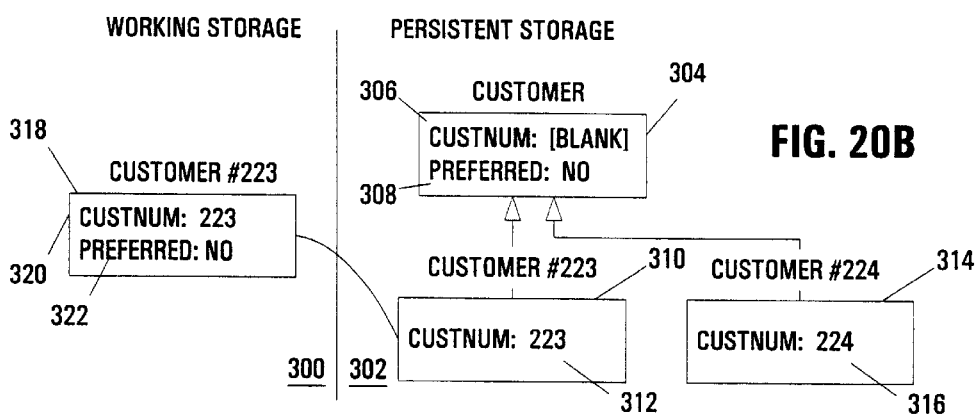
Figure 20C:
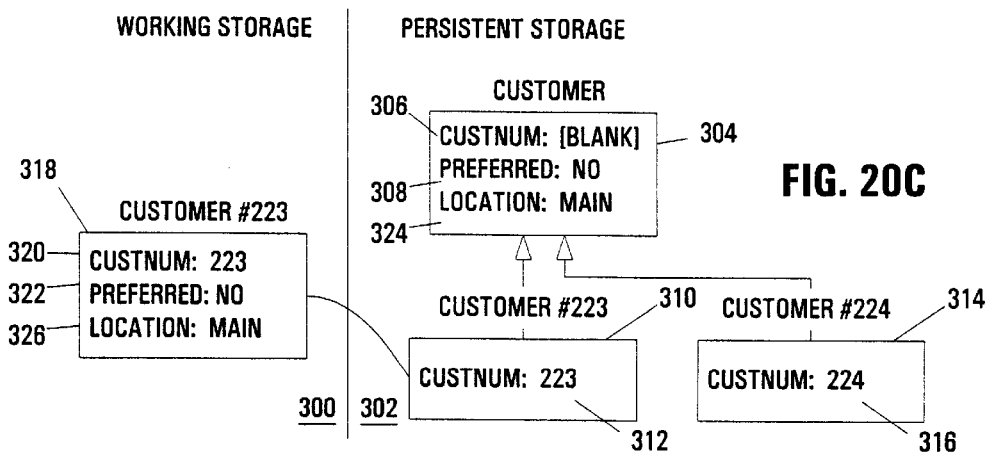

FIGS. 20A–20C illustrate a working example of implicit inheritance. As shown in FIG. 20A, for example, a working storage 300 and a persistent storage 302 are illustrated as including a parent entity ("customer") having a persistent representation 304 with a customer number ("CUSTNUM") field 306 (with a "blank" or null value) and a preferred field 308 with a default value of "no". An exemplary pair of child entities ("customer #223" and "customer #224") with persistent representations 310, 314 are also illustrated, with each including a customer number field 312, 316 that overrides the customer number field 306 of the parent entity. However, given that each child entity does not explicitly override the preferred field 308, each child entity is considered to implicitly inherit this field from the parent entity.

It is assumed for the purposes of this example, that in the configuration of FIG. 20A, the "customer #223" child entity has been placed "in-use", and the entity has been loaded into memory, creating a working representation or wrapper 318 in working storage 300. Assume also that a handle to the customer number field for the in-use child entity has been retrieved via a get field request directed to working representation 318. As a result of the operation of get field routine 220 (FIG. 15), a working copy 320 of the customer number field is created within wrapper 318, with an alias included in such working copy so that the value "223" stored in the overriding field 312 would be returned as a result of a "get value" request on the field.

It should be appreciated that the inclusion of the specific value in field 320 does not require that the data itself be stored in wrapper 318. As discussed above, for example, an alias to field 312 of persistent representation 310 may be included within field 320, so that an access to field 320 results in retrieval of the requested value directly from field 312.

FIG. 20B illustrates the result of a "get field" request for the preferred field directed to the "customer #223" child entity. Via the operation of get field routine 220 (FIG. 15), it would be determined that the "customer #223" child entity does not own the "preferred" field. As such, an alias to the "customer" parent entity would be traversed, and it would be determined that the parent entity owns the "preferred" field. As a result, a working copy 322 of the "preferred" field is created in wrapper 318 (including an alias to field 308 in persistent representation 304), and a handle to field 322 would be returned as a result of the operation. Any subsequent request to access the contents of the field would result in retrieval of the requested value directly from field 308 in persistent representation 304.

As such, it should be noted that, for the implicitly inherited "preferred" field, only the working representation 318 of the child entity is modified. The persistent representation 310 typically remains unchanged, and no space is used up in the persistent storage to redundantly store the same "no" value for the "preferred" field.

FIG. 20C next illustrates the result of an "add field" request directed to the "customer" parent entity, in particular to add a "location" field to the entity.

In response to such a request, add field routine 270 (FIG. 18) would be executed for the parent entity, resulting in the creation of a new location field 324 in persistent representation 304 (a sample value is also shown, although storage of such a value may or may not be performed via a separate "set value" operation). Then, a "new field" event would be published to all in-use children of the parent entity—in this case, the "customer #223" child entity, and a working copy 326 of the field would be created in the wrapper 318 therefor, including an alias to the persistent representation of the field in the persistent copy of the parent entity.

It should be noted, however, that for any non-used child entities of the parent (e.g., the "customer #224" child entity), such child entities would not be updated immediately to reflect the new inherited field, since no working copies thereof would exist in working storage 300, and thus no subscriptions would be active for any such child entities. As a consequence, it may be seen that, for example, if a parent entity had thousands of child entities, but only a few of such child entities were in use, the addition of a field to the parent entity would require immediate modifications to only those few child entities that were in use—a substantial savings in terms of efficiency and response over a design where modifications were immediately propagated to all child entities that inherited from a parent entity.

Implicit inheritance may find applicability in other environments, e.g., where separate in-memory and persistent representations of entities are not maintained, or in other environments such as relational database environments. Other modifications will be apparent to one of ordinary skill in the art having the benefit of the instant disclosure.

Selective Inheritance

Another feature that may be implemented in an entity management system consistent with the invention is that of "selective" inheritance, without requiring changes to an underlying database schema. As such, fields or parameters in a parent entity for which it is not desired to be able to inherit into child entities may be selectively restricted from inheritance by such child entities. As with implicit inheritance, selective inheritance is supported by the higher-level schema of entity management system 50, thus permitting selective inheritance to be implemented without modification to the underlying database schema.

In the discussion hereinafter, fields capable of being inherited are referred to as "gene" fields, with other fields being referred to as "non-gene" fields. However, it will be appreciated that this terminology should not be used to limit the invention, as other terminology could be used to refer to inheritable and non-inheritable fields or parameters consistent with the invention.

FIG. 40 shows an example of how selective inheritance could be used. In this example, a Manager entity 620 and an Executive entity 622 have been modeled. Furthermore, in this example, Managers and Executives are each assigned different types of washrooms. To avoid storing an empty or unused field on an Executive, the Manager's washroom field 624 may be defined as a non-gene, while other fields that may be common to a Manager and an Entity (e.g., a name field 626 and a phone number field 628) may be designated as genes, and thus inherited into an Executive. As such, an Executive may have an executive washroom field 630 (which may or may not be a non-gene for the purposes of this example), and by virtue of washroom field 624 of the Manager being designated as non-gene, the field is kept from being inherited into the Executive. Thus, through selective inheritance, potential confusion and programming errors, which might result in an application when dealing with an entity that has two assigned washrooms, are avoided.

In the illustrated implementation, fields or parameters are considered inheritable unless "marked" otherwise. Furthermore, marking a field as not inheritable involves adding an inheritability indicator such as a flag or boolean value to the field that indicates the field is not inheritable, an operation that typically does not require any modification of the database schema.

Figure 41:
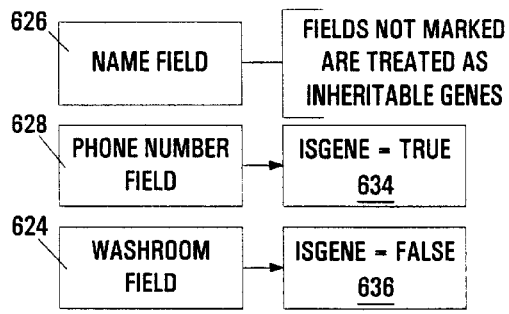
FIG. 41 is a block diagram showing a number of fields from the object diagram of FIG. 40, illustrating the use of gene fields to implement selective inheritance consistent with the invention.

Using the aforementioned entity management system, where fields are implemented as dependent entities that themselves may include dependent entities, a dependent field may be associated with a flag field to indicate a non-inheritable status of the field. As shown in FIG. 41, for example, a mechanism may be used where non-genes are marked as such using a gene field ("isGene") 632, including a stored value of "false," while any field that isn't marked (e.g., name field 626) is assumed to be an inheritable field. This approach reduces the amount of information storage required to support selective inheritance, especially as for many applications the vast majority of fields will be inheritable and only a tiny fraction will need to be marked as non-genes.

Also, as represented by phone number field 628, it may also be desirable to support an explicit inheritable indicator for certain fields, e.g., by using a gene field 634 having a stored value of "true." Such explicit fields may be used, for example, if a field that was once designated as non-gene is changed to a gene. In the alternative, program logic may be incorporated into entity management system 50 to delete a gene field in response to changing a non-gene to a gene.

Figure 42:
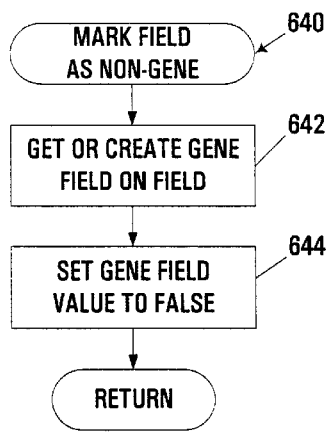
FIG. 42 is a flowchart illustrating the program flow of a mark field routine executed by the entity management system of FIG. 3.

FIG. 42 illustrates a mark routine 640 representing the logic used when a field is to be marked as a non-gene. In response to a request to mark a field, block 642 either creates a new gene field dependent on the field to be marked, or obtains an existing gene field if one already exists. Next, block 644 sets the gene field value to "false" to indicate that the field to be marked is not inheritable. Routine 640 is complete. It will be appreciated that similar program logic could be used to mark a field as inheritable.

Figure 43:
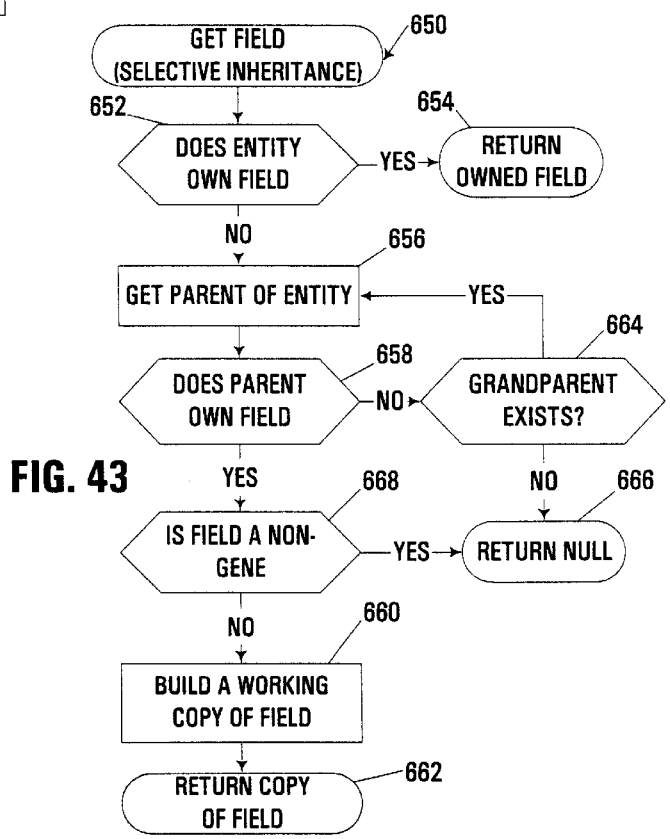
FIG. 43 is a flowchart illustrating the program flow of the get field routine of FIG. 15, and extended to support selective inheritance consistent with the invention.

FIG. 43 illustrates a get field routine 650 representing the logic used to control how fields are inherited from a parent class to a child class. In the illustrated implementation, selective inheritance may be handled as an extension of the implicit inheritance functionality of entity management system 50. As such, routine 650 operates substantially in the same manner as get field routine 220 of FIG. 15, with blocks 652–666 operating in substantially the same manner as the corresponding blocks 222–236 of routine 220.

However, routine 650 differs from routine 220 in that once a parent entity has been found that owns a requested field (block 658), rather than passing control to block 660 to build a working copy of the requested field for the child entity, block 668 is first executed to determine whether the requested field is marked as a non-gene (not inheritable). If not (indicating that the field is inheritable), control passes to block 660 to build the working copy of the requested field as in routine 220. Otherwise, if the field is not inheritable, control passes to block 666 to return a "NULL" alias, indicating that the field cannot be obtained (i.e., it is restricted from being inherited).

It will be appreciated that, in other implementations, fields or parameters may default to non-inheritable. Moreover, other mechanisms, functioning as inheritability indicators for use in identifying a field as inheritable or not may be used, e.g., flags, a centralized data structure, etc. Moreover, an inheritability indicator may stored separate from the field with which it is associated.

Furthermore, selective inheritance may be implemented separate of implicit inheritance in other implementations, and implicit inheritance functionality need not be used in some environments where selective inheritance is implemented. Moreover, selective inheritance may be used in environments that do not manage persistent and working representations of entities in the manner described herein. For example, selective inheritance may be used in environments where child entities inherit parameters from parent entities at the time such child entities are created, such that the determination of whether to inherit a field or parameter, as well as the actual operation of inheriting the field or parameter, are performed in association with the creation of a child entity, rather than in association with attempting to access the field or parameter.

Other modifications will be apparent to one of ordinary skill in the art.

Bi-directional Relationships

Another feature that may be implemented in an entity management system consistent with the invention is that of "bidirectional" relationships. Specifically, native support for bidirectional relationships may be provided by the higher-level schema of entity management system 50, without requiring any modifications to the underlying database schema.

Figure 44:
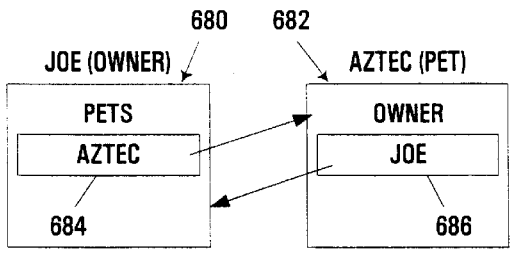
FIG. 44 is a block diagram illustrating a bidirectional relationship between an exemplary owner entity and pet entity in the entity management system of FIG. 3.

As an example, FIG. 44 shows an exemplary bidirectional relationship "Owner-Pets." In this example, an owner Joe has a pet Aztec. In a database, Joe is represented by an owner entity 680 while Aztec is represented by a pet entity 682. The relationship between Joe and Aztec is represented by placing a "Pets" relationship 684 in owner entity 680, and then adding Aztec to that relationship. The inverse of this relationship (seen from the pet's point of view) is that pet entity 682 has an "Owner" relationship 686 placed therein which references owner entity 680.

Figure 45:
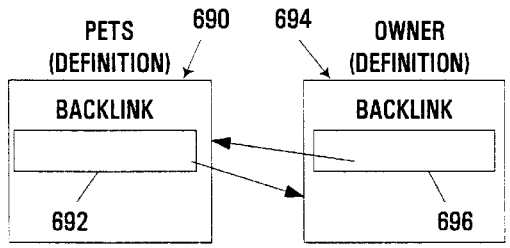
FIG. 45 is a block diagram illustrating a bidirectional relationship definition for use in defining the bidirectional relationship between the entities of FIG. 44.

FIG. 45 illustrates how the illustrated entity management system may model the aforementioned bidirectional relationship. In the illustrated implementation, the bidirectional relationship is modeled via a special entity type referred to as a "relationship definition" entity, which can be thought of as a type of meta-relationship. Each relationship in a database is associated with exactly one relationship definition entity. Moreover, a relationship definition entity provides a construct that is analogous in many respects to an object class or a template, by essentially defining the structure of any defined relationship.

For example, each "Pets" relationship that appears in the database may be defined by a single pets relationship definition entity such as relationship definition entity 690. To support bidirectional functionality, the relationship definition entity includes a backlink relationship entity 692. As is also shown in FIG. 45, a relationship definition entity such as entity 690 can be converted into a bidirectional relationship definition, simply by connecting that definition entity to another definition entity in the database (in this case, an owner relationship definition entity 694, including a backlink relationship entity 696). Connecting two definition entities together to define a bidirectional definition typically involves storing aliases to each definition entity in the opposing backlink fields.

With the aforementioned configuration of references, new definitions can be created at any time, and existing definitions can be modified at any time without requiring a compile or schema evolution, as such bidirectional associations may be created or destroyed in a database without having to change the schema. Because schema changes can be costly—possibly requiring that a database be taken off-line and run through a schema upgrade utility—the aforementioned configuration makes it easier, faster, and less costly to modify the structure of a database.

Figure 46:
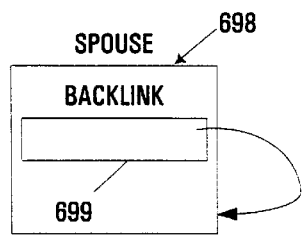
FIG. 46 is a block diagram illustrating a bidirectional relationship definition for use in defining a uniform bidirectional relationship.

In some implementations, "uniform" bidirectional relationships may also be supported, whereby a relationship definition entity can reference itself, signifying that the relationship type is the same on both sides of the bidirectional association. FIG. 46, for example, illustrates a "Spouse-Spouse" bidirectional association represented by a relationship definition entity 698 that references itself via a backlink field 699 referencing entity 698.

Figure 47:
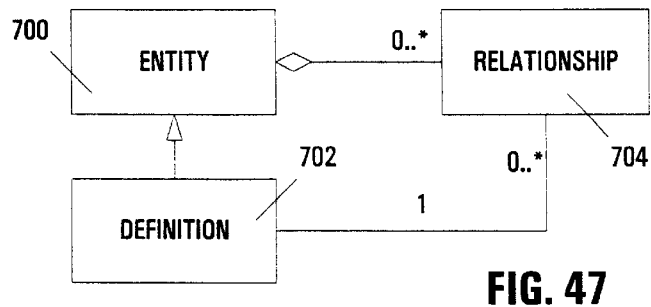
FIG. 47 is a UML class diagram illustrating the relationship of an entity, a definition and a relationship in the entity management system of FIG. 3.

FIG. 47 illustrates a UML class diagram showing the logical arrangement of an entity 700, definition 702 and relationship 704, showing that a definition may be implemented as a specialized type of entity. FIG. 47 also illustrates that any number of relationships 704 may be defined by a definition, but that each relationship is defined by only one definition. Moreover, any entity can have an arbitrary number of relationships associated therewith.

Figure 48:
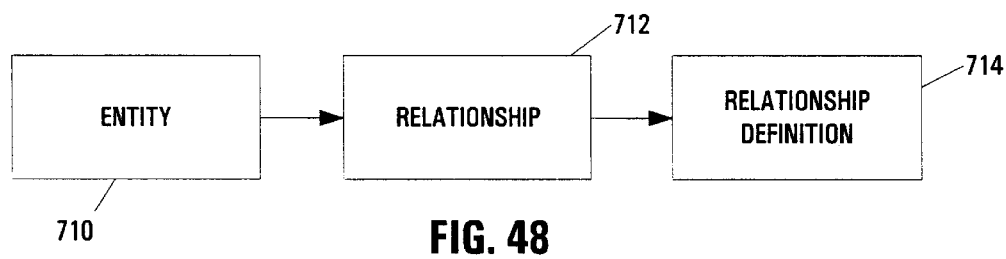
FIG. 48 is a block diagram further illustrating the relationship of an entity, a definition and a relationship in the entity management system of FIG. 3.

FIG. 48 illustrates the high-level schema used by the illustrated entity management system. In this schema, entities 710 may contain zero or more relationships 712. Each relationship, in turn, is associated with exactly one relationship definition 714. The relationship definition itself is a specialized version of an entity, and by virtue of being an entity, a definition can contain zero or more relationships.

Note that the high-level schema used by the illustrated implementation does not explicitly define bidirectional relationships. That is, the backlink relationship is not defined directly in the schema. Instead, the illustrated implementation uses the flexibility of the high-level schema to define bidirectional relationships as a special type of relationship. Thus, the backlink relationship is modeled as a high-level relationship, rather than a relationship built directly into the schema.

Figure 49:
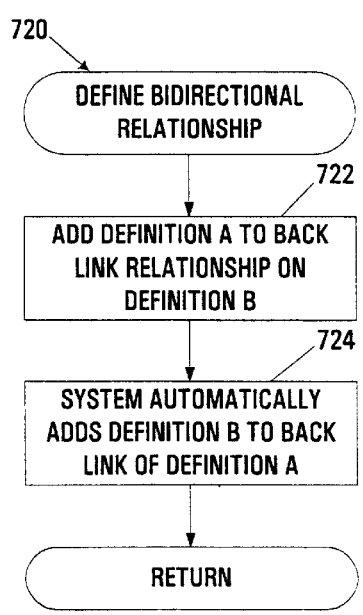
FIG. 49 is a flowchart illustrating the program flow of a define bidirectional relationship routine executed by the entity management system of FIG. 3.

FIGS. 49–52 illustrate a number of routines implemented within the illustrated entity management system to manage bidirectional relationships. FIG. 49, for example, illustrates a define bidirectional relationship routine 720 used to make a relationship bidirectional. Assuming first that two relationship definitions (or one relationship definition, if one is making a uniform bidirectional relationship) exist, and that it is desired to create a bidirectional relationship definition from these existing relationships. For illustrative purposes, the two existing definitions are referred to as definitions "A" and "B". Routine 720 begins in block 722 by adding an alias to definition "A" to the backlink field on definition "B," e.g., in response to a user or developer providing user input to so do.

At this point, no further user interaction may be required so long as the backlink relationship may be defined as a uniform bidirectional relationship, so that (as shown in block 724) entity management system 50 will automatically create the inverse relationship by adding definition "B" to the backlink relationship on definition "A," using the same logic as with any other bidirectional relationship (described further in FIG. 50, below). Put another way, the backlink field in the relationship definition itself may be implemented as a relationship, with such relationship related to a backlink relationship definition that has been configured as a "uniform" bidirectional relationship definition (e.g., similar to definition 698 of FIG. 46). It may be seen that the flexibility of the entity management system's high-level schema provides the ability to utilize such an implementation with significantly less complexity than would be possible in other environments.

Upon completion of routine 720, all relationships based on definitions "A" and "B" will behave as bidirectional relationships. As a component of this functionality, this also means that entity management system 50 will automatically "fix up" the inverses for each relationship, as described below in connection with FIGS. 50–52.

Figure 50:
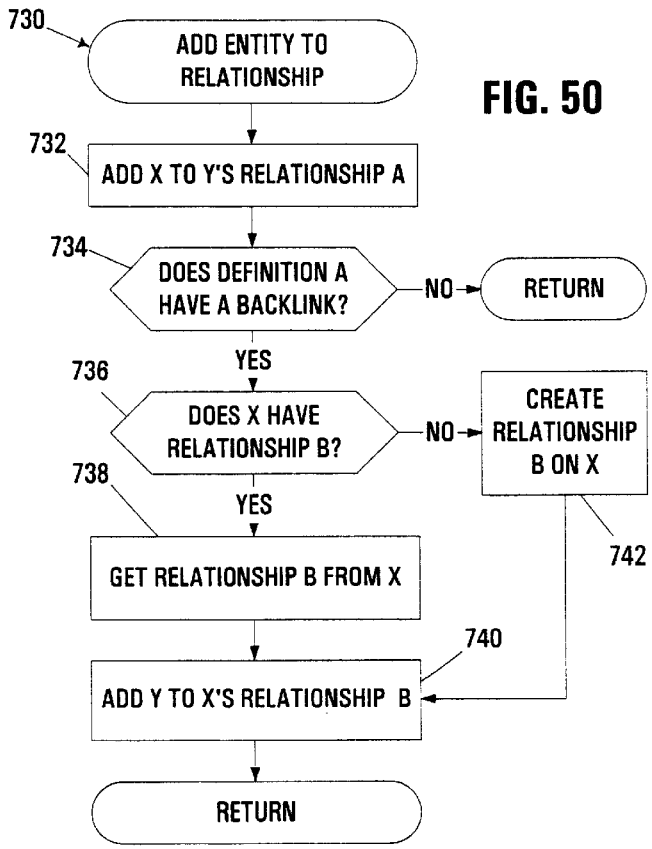
FIG. 50 is a flowchart illustrating the program flow of an add entity to relationship routine executed by the entity management system of FIG. 3.

In particular, FIG. 50 illustrates an add entity to relationship routine 730 showing the logic used by entity management system 50 when an entity is added to a relationship. Routine 730 is configured to support both bidirectional and non-bidirectional relationships. Moreover, it is assumed for this routine that an entity "X" is being added to a relationship "A" that is already associated with another entity "Y".

Routine 730 begins in block 732 by adding an alias to entity "X" to entity "Y"'s relationship "A." Next, block 734 determines whether relationship "A" is a bidirectional relationship, e.g., whether the relationship definition for relationship "A" possesses a backlink field indicating that the relationship should be bidirectional. If not, addition of the entity to the relationship is complete, and routine 730 therefore terminates.

If, on the other hand, the relationship is bidirectional, block 734 passes control to block 736 to determine whether entity "X" possesses a relationship "B", that is, whether a relationship "B" entity has been created for entity "X". If so, an alias to relationship "B" is obtained from entity "X" in block 738, and an alias to entity "Y" is added to entity "X"'s relationship "B". Routine 730 is then complete.

Returning to block 736, if no relationship "B" exists for entity "X", control passes to block 742 to create such a relationship entity. Control then passes to block 740 to add the alias to entity "Y" for the newly created relationship entity. Routine 730 is then complete.

It may therefore be seen that, in response to the addition of an entity to a relationship, the entity management system automatically adds any corresponding inverse for a bidirectional relationship, even including creating the inverse relationship entity if necessary. Consequently, specific user interaction to ensure that both directions of a bidirectional relationship are created is often not required.

As an example, FIG. 53 illustrates an exemplary pair of entities 770, 772. Assume an owner entity 770 includes a pets relationship (not shown separately), and that a request is made to add a pet entity 772 to the pets relationship for the owner entity 770. Assuming also that the pets relationship is bidirectional by virtue of the definition of FIG. 45, routine 730 of FIG. 50 will automatically create an owner relationship 774 in pet entity 772 if no such relationship previously existed, with an alias to owner entity 770 stored in owner relationship 774.

FIG. 51 illustrates a complementary remove entity from relationship routine 750, showing the logic used by entity management system 50 when an entity is removed from a relationship. Routine 750 is configured to support both bidirectional and non-bidirectional relationships. Moreover, it is assumed for this routine that an entity "X" is being removed from a relationship "A" that is already associated with another entity "Y".

Routine 750 begins in block 752 by removing entity "X" from entity "Y"'s relationship "A". Next, block 754 determines whether relationship "A" is a bidirectional relationship, e.g., whether the relationship definition for relationship "A" possesses a backlink field indicating that the relationship should be bidirectional. If not, removal of the entity from the relationship is complete, and routine 750 therefore terminates.

If, on the other hand, the relationship is bidirectional, block 754 passes control to block 756 to get the inverse relationship "B" for entity "X". Block 758 then removes entity "Y" from "X"'s relationship "B". Routine 750 is then complete.

FIG. 52 next illustrates a destroy entity "Y" routine 760 that shows the logic used by entity management system 50 when an entity is destroyed that contains one or more relationships. As represented in blocks 762, 764, and 766, each relationship "R" associated with entity "Y" is visited in turn, and each of the entities referenced therein is removed, e.g., using the logic of routine 750 complete the removal.

Consequently, through the operation of routines 730, 750 and 760, a predominantly automated mechanism is provided to manage relationships, and in particular bidirectional relationships, so that coherence is maintained throughout the entity management system.

It will be appreciated that, when converting a definition from unidirectional to bidirectional, or vice-versa, an entity management system may be required to decide what to do with existing relationships based on that definition. In the illustrated implementation, a minimalist approach may be taken, one that does not attempt to update existing relationships, either to add matching entities to newly defined bidirectional relationships, or to remove entities from previously defined bidirectional relationships. In other implementations, however, performing such actions is possible, and could be performed, for example, by higher-level application code, as appropriate to the situation. Other modifications will be apparent to one of ordinary skill in the art.

Integrated Development and Runtime Environment

In the discussion hereinafter, a discussion is presented of an exemplary utilization of the aforementioned entity management system and associated functionality supported thereby. In this exemplary utilization, a dynamic graphical user interface (GUI) application development and runtime environment supports rapid application development via reusable, data-driven behavioral and interface frameworks. The behavioral aspect of an application is supported by a task-oriented execution model (e.g., represented at 60 in FIG. 3), while the interface aspect of an application is supported by a user interface model (e.g., represented at 62 in FIG. 3). In both models, program logic resides in a database, and is accessed, manipulated, modified and extended principally through the access, combination and customization of object-oriented program entities residing in the database.

While the hereinafter-described execution and interface models are described as operating in conjunction with one another to provide a flexible, dynamic, and powerful development and runtime environment, it will be appreciated that either model, and the concepts upon which either model is based, may be utilized in a wide variety of alternate environments. Therefore, the invention is not limited to the particular implementation discussed herein.

Task-oriented Execution Model

As mentioned above, a task-oriented execution model 60 (FIG. 3) consistent with the invention typically controls application or program behavior principally through controlling the content of information in a database, rather than by requiring a user or developer to write new source code or modify existing source code. While some new behaviors may still require traditional software effort in some implementations, the level of behavioral flexibility and reuse provided by the herein-described execution model is typically higher than any other conventional development or execution model.

The herein-described execution model is based upon an analysis of application behavior, with special emphasis on modern applications built around a graphical user interface. The execution model decomposes application behavior into four distinct components. The first three parts are: information retrieval ("Getter"); information validation or verification ("Verifier"); and command execution ("Command"). The fourth component ("Task") is an encapsulating entity that ties the other components together and serves as a controller or manager for the other components.

In the illustrated implementation, the execution model includes a reusable framework designed to load tasks and their constituent components from a database (e.g., a non-volatile memory) and execute the methods associated with those components. New methods can be written and registered with the model without requiring any changes to the reusable framework. Moreover, as will become more apparent below, an application's user interface may also be implemented as a reusable framework built with knowledge of the execution model. As a result, in many instances an applications's behavior can be radically modified without changing a single executable component of the application. In addition, this single application can be used as the "engine" underlying dozens of different applications, each with a unique interface and behavior, and often without requiring any software changes at all.

FIG. 21 illustrates at 400 the principal components that make up the persistent structure of an executable task as would be maintained in a database. Each executable task includes a task entity 402, zero or more getter entities 404, zero or more verifier entities 406, and zero or one command entity 408 associated with it. In addition, a command entity can also have one or more verifier entities 406 directly associated with it (as represented by arrow 410 of FIG. 21).

FIG. 22 illustrates at 420 an execution mode for a task, including the additional information used by a task while it is being executed. Specifically, while in an execution mode, a task creates and operates on two additional pieces of information, an argument set entity 422 and a result set entity 424. In the illustrated implementation, neither of entities 422 and 424 is persistently stored in a database, but is maintained solely in working memory. In other environments, however, persistent representations of either entity may be maintained.

Each task entity 402 functions as a controller for a particular executable task. The task entity initiates and supervises the execution sequence, and each task instance also serves to bind together a unique set of getters and verifiers with a particular command.

Getter entities, or getters, 404 retrieve information and place that information into an argument set 422 for a task. Each unique getter can retrieve information of a different type or from a different source. Getter may be configured to load information from a database, although other getters may use system information (such as the current date and time), externally available information (such as a stock price listed on a web site), user input, or even calculated information using a particular algorithm.

Verifier entities, or verifiers, 406 make sure the information in the argument set 422 is valid for a current Task instance. Validation can be very basic (such as ensuring that required entries in the argument set are present) or very involved (such as ensuring that a current user has security rights to perform the associated action).

A command entity, or command, 408, typically performs some action or function for a task. Like most functions, most commands are parameterized by the argument set 422, and perform their action on or using information contained therein. A command does not have to be parameterized, however, and some commands do not utilize information in the argument set. If a command creates new objects, e.g., forming the results of the action performed by the command, the command places such object into the result set 424.

In the illustrated implementation, tasks are made up of both executable software code and persistent data. The code portion, in turn, is made up of two parts: architecture code and instance methods. Table II, below, shows the relationship between the logical elements and their code and data pieces:

TABLE II

Task Code and Data

| Logical | Architecture Code | Instance Method | Data |
| --- | --- | --- | --- |
| Task | Task Class | Task Method | Task Object |
| Getter | Getter Class | Getter Method | Getter Object |
| Verifier | Verifier Class | Verifier Method | Verifier Object |
| Command | Command Class | Command Method | Command Object |

The architecture code acts like a parser, reading and interpreting data for each element type, and then (for Getters, Verifiers, and Commands) invoking the associated instance method. As shown in FIG. 23, for example, each architecture class (task class 430, getter class 432, verifier class 434 and command class 436) provides a software API (execute( ) method 440, getArgument method 442, verifyArguments( ) method 444 and execute( ) method 446) that is used during execution mode. Thus, whenever a task is invoked, the execute( ) method on the Task class is called, and the task, in turn, calls the getArgument( ) method for each of its getter classes, and so forth (discussed in greater detail hereinafter in connection with FIG. 25).

On the other hand, the architecture classes rarely change in the illustrated implementation. They typically hold common functionality that would otherwise have to be duplicated by every instance method. In this way, the architecture code reduces the cost of writing new instance methods, providing a significant benefit over conventional development environments.

Each instance method provides some unique behavior. Table III, for example, shows a list of sample instance methods for each key type of entity:

TABLE III

Sample Instance Methods

| Getter Methods | Verifier Methods | Command Methods |
| --- | --- | --- |
| Get Selection | Check Argument Type | Copy Object |
| Get Current Date | Check Security Rights | Create Directory |
| Get Value from Edit Control | Is Argument Present | Open Window |

A toolkit may be envisioned including a hundred or more individual getter, command, and verifier methods to cover a wide range of tasks. Advantageously, such methods may be relatively simple in nature, and capable of performing very small "atomic" behaviors that are suitable for reuse in many different tasks, so that the need to create additional instance methods via software programming is substantially reduced.

As discussed above, each key task entity is typically described by persistent data. Thus, when a new task is created, a new task object is created in the non-volatile memory (database). When it is desirable to change the way a task behaves, such change may often be implemented by simply changing which getters or command with which the task is associated. As such, the behavior of an application may be changed dynamically, and without having to write new software, generate software, or re-compile an application. Often, modifications to the functionality of a task may be implemented principally through setting attribute values and changing the contents of relationships between objects in the database in a well-defined manner.

FIG. 24 illustrates the structure of the persistent objects for each entity associated with a task, namely a task object 450, a getter object 452, a verifier object 454 and a command object 456. Each object includes a name and a description field. Moreover, each getter, verifier and command object 452–456 includes a method ID that identifies the associated instance method for such object. As will be discussed in greater detail below, each instance method is assigned a globally-unique identifier used to identify the program code for the instant method, and so the object associated with executable code via such method ID. Each getter object 452 also includes a count of field storing the number of arguments generated by such getter.

The aforementioned execution model objects are all described in the illustrated implementation using the above-described schema from the illustrated entity management system. This schema is very flexible, and makes it relatively easy to modify the structure of objects in the database. Tasks often may rely heavily on this flexibility, especially with the getter and verifier objects, as both of these objects typically have additional fields that are used by the associated instance method. Implementing the task-oriented execution model without the aforementioned schema or its equivalent is possible, but would typically be more expensive and time-consuming.

Figure 25:
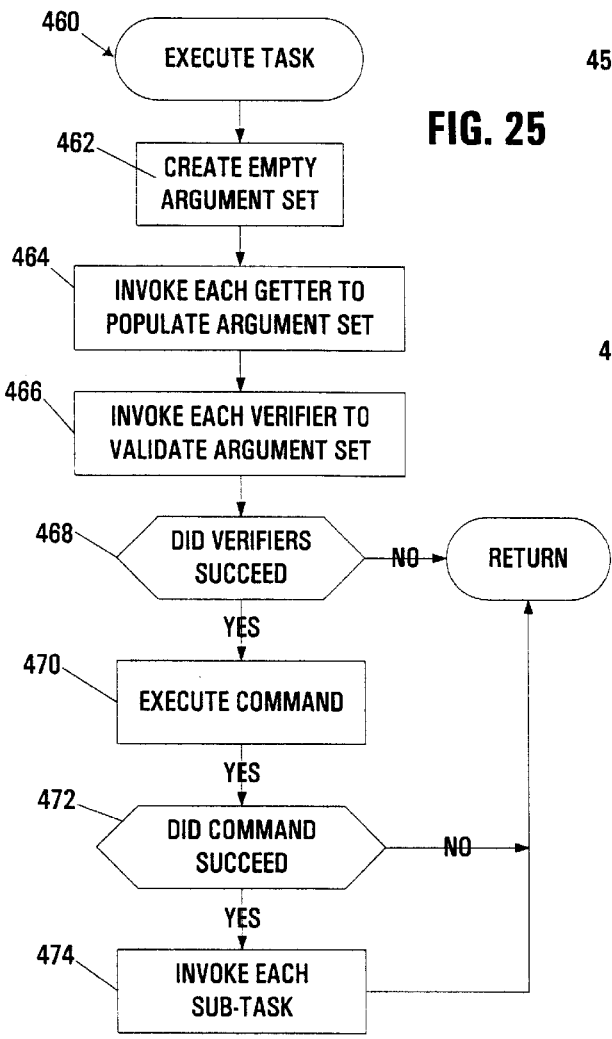
FIG. 25 is a flowchart illustrating the program flow of an execute task routine illustrating the execution sequence for a task consistent with the invention using the execution model of FIG. 3.

FIG. 25 illustrates via execute task routine 460 the logic used by a task during execution. The process of execution is typically initiated by the end user, e.g., by selecting a menu item, pressing a toolbar button, using an accelerator key, performing a mouse drag-and-drop operation, etc. However, task execution can be directly initiated by an application in some embodiments. For example, in a client-server environment, server-side code could invoke a task in response to a request sent from a client side.

Routine 460 generally begins in response to a request to execute a task. At block 462, an empty argument set object is created (typically in volatile memory), and at block 464, each getter object is invoked to populate the argument set. Next, block 466 invokes each verifier object to validate the argument set, and then to block 468 to verify whether it is permissible for execution of the task to proceed.

If so, control passes to block 470 to execute the associated command object. Block 472 then determines whether the command succeeded. If so, control passes to block 474 to optionally invoke any sub-tasks (i.e., reusable tasks capable of being extended or assembled to perform more complex operations). Once all sub-tasks have been invoked, routine 460 is complete. Moreover, returning to blocks 468 and 472, if either a verifier or the command does not succeed, routine 460 is immediately terminated.

The overall sequence of steps in routine 460 is controlled by the task entity. Each task is typically self-contained, and each task typically gathers its own arguments and determines for itself if the current application state will allow the command to complete successfully. Often, such a construct greatly reduces the software development cost of using the execution model in new situations (for example, if one e wanted to develop a new type of user interface element, or if one wanted to have a task execute in response to a clock-tick or other system event).

The above-described execution model may be utilized to implement a wide variety of program functions. To expand the functionality of an execution model consistent with the invention, however, a number of additional features may be implemented.

Figure 26:
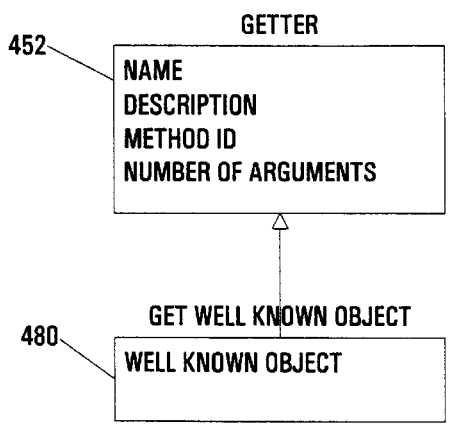
FIG. 26 is a class diagram illustrating the structure of a get well known object class consistent with the invention.
Figure 27:
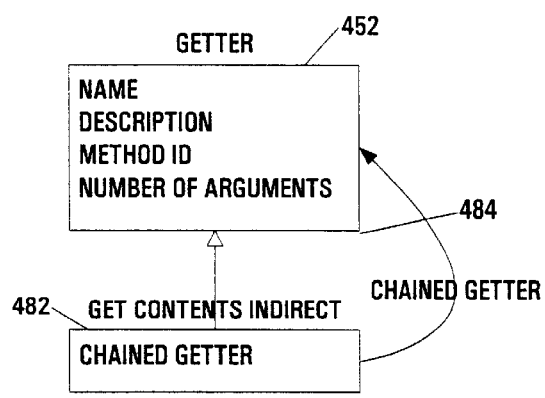
FIG. 27 is a class diagram illustrating the structure of a get contents indirect class consistent with the invention.

For example, as shown in FIG. 26, one getter instance method that may be implemented is a "get well known object" instance method 480, which takes an item from a special relationship on the getter object 452 and adds that item to the argument set. As another example, "chained" getters may be implemented to add a level of indirection to the getter logic, which can provide substantially increased flexibility in argument retrieval. An example of a chained getter is a "get contents indirect" getter 482, shown in FIG. 27, which includes a reference 484 to one or more subordinate getters and then further "interprets" the object(s) returned by that getter or getters. A subordinate getter, in turn, may be a "simple" getter or itself could be a chained getter to provide an even more complex retrieval.

Figure 28:
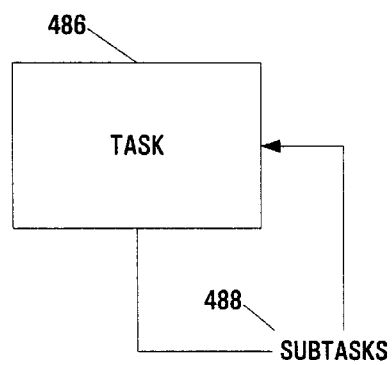
FIG. 28 is a block diagram illustrating the relationship between a task and one or more sub-tasks capable of being executed thereby.

Also, as shown in FIG. 28, each task (e.g., a task 486) can have zero or more associated sub-tasks (e.g., as represented at 488). Doing so allows a developer to build more complex tasks, and furthers facilitates keeping individual instance methods simple and "atomic" in nature. To support chained tasks, the argument set and result set for a master task can be made available to all of the master task's sub-tasks. In this regard, it may also be desirable to utilize dedicated getters that are capable of accessing information from a "previous" argument set and result set, thus increasing the connectivity of the chained task mechanism.

Furthermore, it is typically desirable to configure verifiers to simply return a "yes/no" answer whenever possible, based on the state of an argument set, the state of an application, or according to some other criteria. As a result, verifiers may be used not only to validate an argument set, but may also provide conditional logic for an execution sequence. As such, in some configurations it may be desirable to enable some sub-tasks to be conditionally executed, getters that are conditionally executed, or even verifiers that are conditionally executed.

In addition, it may also be desirable to use tasks not only to perform actions, but also to determine if a particular action can be performed at a certain time (also referred to herein as "prevalidating". That is, a canExecute( ) method may be supported by a task, as well as an execute( ) method. The canExecute( ) method may be used, for example, by a menu item, toolbar button, or other user interface (UI) control to enable and disable itself. Thus, when a menu is displayed, each menu item may call its associated canExecute( ) method, which would uses the task's getters to build an argument set and pass the argument set to the verifiers on both the task itself and the command. If all verifiers return "success," the canExecute( ) method could return "true" so that the menu item would be enabled. Otherwise, the menu item would be disabled.

To fully support canExecute( ), it is desirable for getter objects and verifier objects to be capable of being marked "don't prevalidate." When an object is marked in this way, the associated instance method would not be called during the canExecute( ) operation, although the method would be called during normal execution. In the case of a getter, a dummy argument or arguments could be added to the argument set instead. Providing such functionality is often beneficial since some getters and verifiers may be configured to open dialog boxes, or perform other time-consuming tasks, and thus it would not be desirable to fully execute such components when simply determining whether a task should even be enabled.

In addition, with respect to an argument set or a result set, various implementations may be used. For example, it may be desirable to support the "multiple selection" capabilities of modern applications. To do so, it may be desirable to implement an argument set as a two-dimensional array of elements to support the ability for arguments to be represented by more than one entry.

In addition, it may be desirable for an argument set to support variable types for arguments. That is, an argument might be a string, number, or object. To support such variable types, therefore, it may be desirable to implement a "variable type" class that can include a single data item of any type, along with information about what kind of information is actually being held. Thus, each entity in an argument set may be implemented as a "variable type" instance.

Moreover, as discussed above, it may be desirable to uniquely identify instance methods for getters, verifiers and commands. Such identification may be implemented, for example, using Globally Unique Identifiers (GUID's) for each instance method. As shown in FIG. 24 above, each getter, verifier and command object in the database may have a data field that contains the GUID of the instance method that should be invoked for that object. The task architecture may also provide a way to associate a particular GUID to its instance method during task execution.

To facilitate the use of GUID's, it may also be desirable to use a pre-registration approach for instance methods, and require that each instance method be registered with a centralized controller class before it is invoked. An alternative approach would be to store all instance methods in DLL's, and to store the method name and DLL name as part of the associated persistent object. Doing so would allow instance methods to be located as they are needed. However, it has been found that the pre-registration approach often simplifies method lookup while an application is running, and also improves application performance. However, the pre-registration approach may require that additional startup program code be called by a developed application to pre-register instance methods on startup of an application.

Centralized control over tasks may be implemented, for example, using task and command manager classes that function as "helper" classes that aren't necessarily persistent and aren't necessarily part of the logical design of the execution model. Such helper classes may be supported to serve various utility roles, such as "caching" tasks, commands, etc., in memory, pre-registering instance methods, and providing a number of helpful methods such as "Instantiate Task Class from Task Object," "Invoke Getter Method By ID," etc.

A number of additional functions may also be supported in an execution model consistent with the invention. For example, it may be desirable to maintain a command history entity for use in performing undo/redo operations. To do so, each command execute( ) method may be configured to populate the command history entity with sufficient information for undoing the operation. Undo/redo functionality, however, may be implemented in a number of different manners, or may be omitted entirely from an execution model.

Thus, it may be seen that, so long as the appropriate task, getter, verifier and command entities are provided to a developer or end user, a wide variety of complex, flexible and powerful applications may often be completely implemented using the aforementioned execution model, e.g., with tasks being used for each menu item, toolbar button, and other controls supported by an application. Whenever a menu is displayed, for example, the aforementioned execution model permits the verifiers on each task to determine if the associated menu item should be enabled or disabled. Then, when a menu item is selected, the execution model executes the associated task to perform the desired action.

Also, by modifying task information in the database, the behavior of an application may be changed dynamically with relative ease. By swapping tasks between two menu items, a user would also be swapping the way those menu items behave. By removing a verifier from a command or task, a menu item could be forced to always be enabled, even if the associated action could not be performed. By changing the getters or command on a task, the behavior of a menu item could simply be changed from "copy to clipboard" to "delete the current selection" or "send email."

As an example of a representative task created by the aforementioned execution model, consider the possible variations on a "copy" command, where one item is copied into another item. FIG. 29, for example, illustrates an exemplary task 490 used to perform a clipboard copy operation. Task 490 includes a pair of getters 492, 493, a command 494 and a pair of verifiers 495, 496. Getter 492 retrieves the current item in a clipboard (representing the source), and getter 493 gets a currently selected item (representing the copy destination). Command 494 is a "copy" command, that takes source and destination arguments from a result set and simply copies the source to the destination. In connection with this operation, verification is done by verifiers 495 and 496 that simply check if such source and destination arguments are present in the result set. It may be seen, therefore, that each of items 492–496 performs small, atomic operations that, when assembled together, perform a useful task.

By configuring copy command 494 in a generic manner to be independent of the actual data representing source and destination, reusability of command entity is possible. Thus, for example, as an illustration of the reusability and flexibility of the execution model discussed herein, FIG. 30 illustrates another task 497 for performing a drag and drop copy operation. It may be seen that the source and destination of the copy are generated via different getters 498 and 499, which respectively retrieve an item being drug, and a drop target. However, by reusing the same command 494 and verifiers 495, 496, a completely different task may be constructed from task 490.

The aforementioned execution model offers a number of benefits over existing rapid development tools and processes. First, the execution model is highly data-driven, such that application behavior can often be changed without having to generate, compile, or modify any source code. Second, unlike stored procedures, the execution model decomposes the concept of "procedure" into several parts, thus increasing the reusability and flexibility of each individual part, and reducing the need to modify source code in the face of unexpected requirements changes. Third, while adding new getter, verifier, and command methods often does require some software engineering, each individual method can be written as a discrete component. A developer does not have to integrate each method into its correct spot in the application. Instead, this integration is done in the database, not in code. As a result, it is often easier and faster (especially from a testing and quality assurance point of view) to add new functionality using the task approach than with code generation or visual programming, as the chance of breaking "unrelated" functionality is much lower.

There is also an additional benefit over standard component software development, as traditional components often represent a large block of functionality that either (a) cannot be easily decomposed and customized or (b) requires extensive software integration work. Well-designed task elements are inherently small and decomposable, and integration is done through data manipulation, not via more expensive and time-consuming software engineering.

Other modifications and variations on the aforementioned execution model will be apparent to one of ordinary skill in the art having the benefit of the instant disclosure.

User Interface Model

As discussed above, the aforementioned execution model may be used in connection with a user interface model (represented at 62 in FIG. 3) that builds upon the functionality of the execution model to support a dynamically-modified and customizable GUI application. As with the execution model, program logic for the user interface model resides in a database, and is accessed, manipulated, modified and extended principally through the access, combination and customization of object-oriented program entities residing in the database.

The user interface model decomposes a user interface into its constituent logical elements, including views, menus, and controls, and applications written using it are typically independent of the operating system mechanisms used to actually display the views and menus. In various embodiments, the user interface model may be used to generate local applications using the Windows operating system, as well as distributed applications, e.g., using HTML, XML, and other mechanisms to display a user interface and accept user input.

In the illustrated implementation, all logical elements in the user interface (UI) are stored as data in a database, so that the content and arrangement of UI elements can be modified using visual tools that modify the database, and typically without requiring that the application be rebuilt. The benefits of this approach are several. First, the turn-around time for changing an application is greatly reduced, as the tasks of writing code, recompiling, and re-linking the application are removed from the development process. Second, the cost of making such changes is reduced, as usually no traditional software engineering is required, eliminating potentially costly software engineering expenses. In fact, the changes may often be made using the same editing gestures made by an end user. This makes it easier for user interface experts, or even experts in a target domain, to either make the changes themselves or to directly oversee changes as they are being made. This also reduces communications costs, and the potential for a communication gap, associated with translating a user's problem into a particular user interface design and then into a software implementation.

Second, the herein-described user interface model separates interface behavior from interface appearance. This means that customizing an application's behavior typically does not require making any changes to the user interface model. In the illustrated implementation, application behavior is also implemented as a reusable, data-driven framework via the aforementioned execution model.

In the illustrated implementation, the principal entity defined in the user interface model is that of a view, which functions as a container for one or more contained entities such as user interface controls, menus, etc. A view may also contain other views (described herein as "sub-views") that further contain additional entities for inclusion in a portion of a defined view.

FIG. 31 illustrates a persistent structure of an exemplary view object 500, including the principal entities defined within a view, including a frame 502, a form 504, a menu 506 and a control bar 508. Further, within form 504 may be included one or more controls 510.

A view, or view entity, 500 represents the highest level entity in the user interface model, and is analogous in many respects to the task entity in the execution model. Often, a view is represented as a GUI window that defines a particular interface for interfacing a user with a particular set of data stored in the database. Also, views may be contained within other views (i.e., as sub-views) to define collections of related controls in a particular region of a parent view. Views are named, and as such, each entity 500 includes a name field that identifies the view.

A frame, or frame entity, 502 represents a window or panel on the display, and having the purpose of housing one or more forms, managing input focus, maximizing/minimizing, restoring and closing views. A frame entity, for example, may be implemented as a wrapper to a framework frame object, e.g., the CFrameWnd object used by a Hyperview Form, or a similar object utilized in other conventional user interface frameworks that the user interface model may utilize as the underlying program code supporting a GUI environment. At a minimum, a frame entity includes position and size parameters that define the display extents of the frame. A frame entity also typically includes an indication of whether the frame is included within another window or should be displayed as a separate dialog box.

A form, or form entity, 504 manages the interaction between a user and the data being operated on. A form typically includes one or more controls 510, representing various types of GUI controls that may be implemented in a GUI environment. In addition, a form typically includes a number of parameters, e.g., an acceptdrops flag that indicates whether objects can be dropped into the form, and a showscrollbars flag that indicates whether scroll bars should be displayed on the form. Typically, a form also includes size information that identifies the size of the form, which may be controlled to be the same size as the frame, or may be a fixed size that is larger or smaller than the frame.

Outside of the form, but still within a view may be provided a menu entity 506, representing a menu bar and associated menus and menu items. In addition, a view may include a control bar or toolbar entity 508 that includes multiple buttons and associated controls. Given the ability to move and resize toolbars in many software applications, it may be desirable to include within a control bar entity position and size data, as well as docking location data and a "isfloating" flag that indicates whether or not the control bar is docked.

Also, as discussed above, various controls 510 are incorporated within each form entity 504. FIG. 32, for example, illustrates the wide variety of control types that may be supported by the illustrated user interface model, e.g., a list control 512, a tree control 514, an HTML control 516, a multi-view control 518 (used to switch between views), a field control 520, a static text control 522, an edit control 524, a push button control 526, a radio button control 530 and a checkbox control 530. Many of the aforementioned controls (as well as the menu and control bar entities) may be implemented simply as wrappers to underlying user interface framework objects, operating system API's, etc. It should be appreciated that practically any type of user interface control may be utilized in the user interface model consistent with the invention.

To manage the large number of different types of controls, views, frames, and other UI elements, the user interface model relies on the aforementioned entity management system to support inheritance among data elements, thus reducing duplication of structure among the many "similar but slightly different" data elements. The entity management system also makes it possible for new data elements to be introduced dynamically, and for the physical structure of existing data elements to be revised dynamically, without having to change the database schema itself. Because changing the schema for a database can be time-consuming and costly, these capabilities, while not absolutely essential to the implementation of the user interface model, do greatly simplify its realization.

It will be appreciated that the view arrangement shown in FIG. 31 is not exclusive, as any reasonable model of user interface elements may be used as the basis for a user interface model consistent with the invention. For example, the model could be implemented using a model similar to MFC or other existing user interface frameworks. Nonetheless, even by implementing models similar to conventional frameworks, the underlying elements forming the user interface model are still stored in a database that is read and interpreted to decide what the user will see during runtime.

FIG. 33 shows an exemplary main application view 532 for a software application built with the herein-described integrated development and runtime environment. View 532 includes a frame 534, menu 536, toolbar 538, and a "form" that contains a pair of sub-views 540, 542. The form is not visible in the figure, as a form manages the layout of individual sub-views and controls inside of views, but itself is typically not a displayed element. Each sub-view 540, 542, in turn, has its own frame and its own form which in turn contains either other sub-views or controls. Sub-views can have their own control bars and menus, although often they do not. Exemplary controls include a tree control 544, a list control 546 and an edit control 548, each of which is shown in FIG. 33.

In the illustrated implementation, the user interface model represents a marriage of executable software code and persistent data. Table IV, for example, shows the relationship between the logical elements and their code and data pieces:

TABLE IV

| | Code and Data | |
|---|---|---|
| Logical | Code | Data |
| View | View Class | View Object |
| Frame | Dialog Frame Class | Dialog Frame Object |
| | Window Frame Class | Window Frame Object |
| Control | List Control Class | List Control Object |
| | Tree Control Class | Tree Control Object |
| | HTML Control Class | HTML Control Object |

As an example, FIG. 34 illustrates graphically how a View Class 550 uses information from View Object 552 to form Logical View entity 500.

In the illustrated embodiment, view management program code in the user interface model operates much like a parser, reading and interpreting data for each UI entity. Each class is configured to create its associated "display" element, e.g., via a suitable API or framework call. In addition, each class is responsible for taking user input and passing that input to the execution model, which responds accordingly.

FIG. 35, for example, illustrates an open view routine 560, representing the logic used when a view entity is to be opened, i.e., interpreted and displayed on a computer display. In block 562, an instance of a view class is created in memory, and associated with a persistent view object that resides in the database. The instantiated view class then reads fields and relationships from the associated view object. When the instantiated view class encounters a frame entity, an instance of the frame class is created (block 564). Likewise, for any menu entities, form entities, or control bar entities, instantiated classes for such entities are created (as represented at blocks 566, 568 and 570).

As shown in FIG. 36, in response to instantiation of a frame class, the instantiated frame class executes a create frame (constructor) routine 580, which interprets the frame object, using operating system and/or UI framework calls to display itself on a display (block 582). This is shown in FIG. 35 by the call to create a new CFormView, which is an MFC class representing one possible implementation of a frame creation call. In other implementations, the frame class instantiation could also make direct Windows calls, make other operating system calls (e.g., if running on a UNIX, Macintosh or other platform), or instantiate an HTML or XML generator (e.g., if running as a web-based server application).

In addition to displaying itself to the user, the instantiated frame class, like each of the other entities in a view, also instantiates its sub-component objects (if any), set its size and position based on information contained in its frame object (block 586), and otherwise initialize itself using the persistent information loaded from the database.

It will be appreciated that implementation of the create routines for various other view entities will be similar in many respects to that for a frame, as in many instances the creation of menus, forms, control bars, and other controls will predominantly consist of function calls to a framework or operating system.

FIG. 37 illustrates a factory create routine 590 representing a factory creation mechanism that may be used to associate a class with a persistent object. Like inheritance, a factory creation mechanism is a well-understood development technique, and is useful for managing a large, diverse group of objects and classes, especially in cases where new types of objects and classes may be introduced over time. While a factory creation mechanism is not essential to implementing a user interface model consistent with the invention, such a mechanism does reduce the cost of adding new types of UI elements to the model, as only the factory needs to be updated to recognize a new element type.

Routine 590 generally begins in block 592 by getting an object type with which it is desired to associated a class. Next, block 594 attempts to locate a creator mechanism for the object type, and block 596 determines whether a creator was found. If not, routine 590 terminates. Otherwise, control passes to block 598 to use the located creator to create the correct class for the object. Routine 590 is then complete.

It will be appreciated that in many implementations the software portion of the user interface model rarely needs to change. This is because the most frequent changes to applications involve adding new menu items, toolbar buttons, dialog boxes, or new controls inside existing dialog boxes and windows. Using the herein-described user interface model, all of these types of changes may be made by simply creating, editing, and associating objects in the database, and not by writing new software. If a new type of control or view was required, it is possible that the user interface model would need to be updated. But it is believed that such changes would be relatively rare.

In use, events generated by the underlying user interface controls, typically via the operating system event management code, are passed to the associated control entities, either for performing actions or modifying the environment. As an example, FIG. 38 shows via a on window resized routine 600 how the user interface model responds to a user event such as a window resize. In this example, when a user resizes a displayed window, the new window size is written back to the database as the frame object's new size (block 602). A similar approach would be used when a window is moved, minimized, or maximized.

In addition, the user interface model responds to other user actions such as selecting menu items, clicking on toolbar buttons or dialog box buttons, or using keyboard accelerators. In such situations, the UI control entities operate as interactors, and user actions are mapped to tasks in the execution model such that a task will be invoked in response to particular user input. Doing so makes it possible for the user interface model itself to be entirely generic and independent of application behavior, thereby increasing the flexibility and reusability of the environment. FIG. 39, for example, illustrates this separation of functionality, showing how a "Send Email" toolbar button object 604 in the user interface model is associated with an OpenEmailWindow( ) task entity 606 in the database. When a user clicks on the displayed toolbar button, therefore, the associated button class entity instantiates the appropriate task entity and then invokes the instantiation to perform the desired action.

The herein-described user interface model offers several benefits over existing rapid development tools and processes. First, unlike many visual development environments, the user interface model is highly data-driven, such that application's user interface can be changed substantially without having to generate, compile, or modify any source code. This means that "visually" arranging and editing the data elements of the user interface produces the desired finished result, and does not require a subsequent, often lengthy and expensive, software engineering step. Second, unlike conventional frameworks, the user interface model represents a finished product, rather than just a set of building blocks. Customizing the user interface model is generally performed via database manipulation, not by writing new source code or recompiling.

Various additional modifications may be made to the herein described embodiments without departing from the spirit and scope of the invention. Therefore, the invention lies in the claims hereinafter appended.

What is claimed is:

1. A method of managing entities from an object-oriented environment in a computer system of the type including a volatile memory and a non-volatile memory, the non-volatile memory including a persistent representation of a parent entity that includes a parameter, the method comprising:
    (a) creating a child entity based on the parent entity;
    (b) accessing the non-volatile memory to determine whether the parameter for the parent entity is inheritable; and
    (c) inheriting the parameter into the child entity if the parameter for the parent entity is determined to be inheritable.

2. The method of claim 1, wherein accessing the non-volatile memory and inheriting the parameter are performed in association with creating the child entity.

3. The method of claim 1, wherein accessing the non-volatile memory and inheriting the parameter are performed in association with attempting to access the parameter with the child entity.

4. The method of claim 3, wherein the parameter is an implicitly inherited parameter, wherein creating the child entity includes creating a working representation of the child entity in the volatile memory associated with a persistent representation of the child entity in the non-volatile memory, and wherein inheriting the parameter includes creating a working representation of the parameter associated with the working representation of the child entity.

5. The method of claim 3, further comprising, in association with attempting to access the parameter with the child entity, determining whether the parameter has been overridden by the child entity, wherein inheriting the parameter into the child entity is performed only if the parameter has not been overridden by the child entity.

6. A method of managing entities from an object-oriented environment in a computer system of the type including a volatile memory and a non-volatile memory, the non-volatile memory including a persistent representation of a parent entity that includes a parameter, the method comprising:
    (a) creating a child entity based on the parent entity;
    (b) accessing the non-volatile memory to determine whether the parameter for the parent entity is inheritable; and
    (c) inheriting the parameter into the child entity if the parameter for the parent entity is determined to be inheritable;
wherein accessing the non-volatile memory to determine whether the parameter for the parent entity is inheritable comprises accessing an inheritability indicator associated with a persistent representation of the parameter.

7. A method of managing entities from an object-oriented environment in a computer system of the type including a volatile memory and a non-volatile memory, the non-volatile memory including a persistent representation of a parent entity that includes a parameter, the method comprising:
    (a) creating a child entity based on the parent entity;
    (b) accessing the non-volatile memory to determine whether the parameter for the parent entity is inheritable; and
    (c) inheriting the parameter into the child entity if the parameter for the parent entity is determined to be inheritable;
wherein accessing the non-volatile memory to determine whether the parameter for the parent entity is inheritable comprises attempting to locate an inheritability indicator associated with a persistent representation of the parameter, the method further comprising determining that the parameter for the parent entity is inheritable if no inheritability indicator is located.

8. The method of claim 7, further comprising marking the parameter as not inheritable by creating an inheritability indicator for the parameter in the non-volatile memory.

9. The method of claim 8, wherein the persistent representation of the parent entity is accessed via a database having a database schema, and wherein marking the parameter as not inheritable is performed without modifying the database schema for the database.

10. An apparatus for use in an object-oriented environment, the apparatus comprising:
    (a) a volatile memory;
    (b) a non-volatile memory;
    (c) a persistent representation of a parent entity that includes a parameter; and
    (d) a program configured to create a child entity based on the parent entity, access the non-volatile memory to determine whether the parameter for the parent entity is inheritable, and inherit the parameter into the child entity if the parameter for the parent entity is determined to be inheritable.

11. The apparatus of claim 10, wherein the program is configured to access the non-volatile memory and inherit the parameter in association with creating the child entity.

12. The apparatus of claim 10, wherein the program is configured to access the non-volatile memory and inherit the parameter in association with attempting to access the parameter with the child entity.

13. The apparatus of claim 12, wherein the parameter is an implicitly inherited parameter, wherein the program is configured to create the child entity by creating a working representation of the child entity in the volatile memory associated with a persistent representation of the child entity in the non-volatile memory, and wherein the program is configured to inherit the parameter by creating a working representation of the parameter associated with the working representation of the child entity.

14. The apparatus of claim 12, wherein the program is further configured to, in association with attempting to access the parameter with the child entity, determine whether the parameter has been overridden by the child entity, and wherein the program is configured to inherit the parameter into the child entity only if the parameter has not been overridden by the child entity.

15. An apparatus for use in an object-oriented environment, the apparatus comprising:
   (a) a volatile memory;
   (b) a non-volatile memory;
   (c) a persistent representation of a parent entity that includes a parameter; and
   (d) a program configured to create a child entity based on the parent entity, access the non-volatile memory to determine whether the parameter for the parent entity is inheritable, and inherit the parameter into the child entity if the parameter for the parent entity is determined to be inheritable;
wherein the program is configured to access the non-volatile memory to determine whether the parameter for the parent entity is inheritable by accessing an inheritability indicator associated with a persistent representation of the parameter.

16. An apparatus for use in an object-oriented environment, the apparatus comprising:
   (a) a volatile memory;
   (b) a non-volatile memory;
   (c) a persistent representation of a parent entity that includes a parameter; and
   (d) a program configured to create a child entity based on the parent entity, access the non-volatile memory to determine whether the parameter for the parent entity is inheritable, and inherit the parameter into the child entity if the parameter for the parent entity is determined to be inheritable;
wherein the program is configured to access the non-volatile memory to determine whether the parameter for the parent entity is inheritable by attempting to locate an inheritability indicator associated with a persistent representation of the parameter, and wherein the program is further configured to determine that the parameter for the parent entity is inheritable if no inheritability indicator is located.

17. The apparatus of claim 16, wherein the program is further configured to mark the parameter as not inheritable by creating an inheritability indicator for the parameter in the non-volatile memory.

18. The apparatus of claim 17, further comprising a database configured to control access to the parent and child entities, the database having a database schema, wherein the program comprises an entity management program configured to access the parent and child entities by interacting with the database, and wherein marking of the parameter as not inheritable by the entity management program does not require modification to the database schema for the database.

19. A program product, comprising:
   (a) a program configured for use in an object-oriented environment in a computer system of the type including a volatile memory and a non-volatile memory, the non-volatile memory including a persistent representation of a parent entity that includes a parameter, the program configured to create a child entity based on the parent entity, access the non-volatile memory to determine whether the parameter for the parent entity is inheritable, and inherit the parameter into the child entity if the parameter for the parent entity is determined to be inheritable; and
   (b) a signal bearing medium bearing the program.

20. The program product of claim 19, wherein the signal bearing medium includes at least one of a recordable medium and a transmission medium.

21. The method of claim 1, further comprising inhibiting inheritance of the parameter into the child entity if the parameter for the parent entity is determined to not be inheritable.

22. The apparatus of claim 10, wherein the program is further configured to inhibit inheritance of the parameter into the child entity if the parameter for the parent entity is determined to not be inheritable.

23. The program product of claim 19, wherein the program is further configured to inhibit inheritance of the parameter into the child entity if the parameter for the parent entity is determined to not be inheritable.

* * * * *